United States Patent
Conrad et al.

(10) Patent No.: US 9,590,690 B2
(45) Date of Patent: Mar. 7, 2017

(54) METHODS AND SYSTEMS FOR CANCELING A BLOCKING SIGNAL TO OBTAIN A DESIRED SIGNAL

(71) Applicant: MOTOROLA SOLUTIONS, INC, Schaumburg, IL (US)

(72) Inventors: Alan P Conrad, Geneva, IL (US); Kevin G Doberstein, Elmhurst, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 315 days.

(21) Appl. No.: 14/574,487

(22) Filed: Dec. 18, 2014

(65) Prior Publication Data

US 2016/0182200 A1    Jun. 23, 2016

(51) Int. Cl.
    *H04B 1/7097*    (2011.01)
(52) U.S. Cl.
    CPC .................... *H04B 1/7097* (2013.01)
(58) Field of Classification Search
    CPC ................................... H04L 5/0048
    USPC ...................................... 370/329
    See application file for complete search history.

(56) References Cited

U.S. PATENT DOCUMENTS

| 4,009,343 A * | 2/1977 | Markey ............. H04B 7/18528 370/321 |
| 8,422,544 B2 | 4/2013 | Wei et al. |
| 8,488,693 B2 | 7/2013 | Ho et al. |
| 8,576,934 B2 | 11/2013 | Kimata |
| 2002/0093908 A1 | 7/2002 | Yeap |
| 2011/0038407 A1 | 2/2011 | Ki et al. |
| 2012/0327795 A1 | 12/2012 | Mallik et al. |
| 2013/0294296 A1 | 11/2013 | Dimou et al. |
| 2014/0044105 A1 * | 2/2014 | Bontu ..................... H04L 5/001 370/336 |
| 2014/0211741 A1 | 7/2014 | Panicker et al. |

FOREIGN PATENT DOCUMENTS

| WO | 0184733 A1 | 11/2001 |
| WO | 2009061084 A1 | 5/2009 |

OTHER PUBLICATIONS

Hardouin et al, Downlink Interference Cancellation in LTE: Potential and Challenges, 2013 IEEE Wireless Communications and Networking Conference (WCNC): PHY, pp. 3597-3602.

* cited by examiner

*Primary Examiner* — Dang Ton

(57) ABSTRACT

Disclosed herein are methods and systems for canceling a blocking signal to obtain a desired signal. An example process includes receiving both a blocking signal and a set of blocking bits corresponding to a demodulation of the blocking signal. A remodulated blocking signal is generated by modulating the received set of blocking bits. The remodulated blocking signal is passed through a blocking-band bandpass filter to generate an estimated blocking signal, and is also passed through a desired-band bandpass filter to generate an unconditioned reference signal. One or more signal-parameter differences between the blocking signal and the estimated blocking signal are identified, and one or more signal compensations are accordingly applied to the unconditioned reference signal to generate a conditioned reference signal, which is then output to a blocking-signal-canceling system.

20 Claims, 15 Drawing Sheets

METHODS AND SYSTEMS FOR CANCELING A BLOCKING SIGNAL TO OBTAIN A DESIRED SIGNAL

BACKGROUND OF THE INVENTION

Wireless communications are important in modern society, and becoming more so all the time. Numerous people use wireless-communication devices in their personal lives and in their work lives as well. In the context of this disclosure, such wireless-communication devices are referred to as mobile radios, though it is explicitly noted that this term covers a wide variety of wireless-communication devices, such as cell phones, smart phones, tablet computers, laptop computers, and the like. Moreover, a given mobile radio could be associated with (e.g., mounted to) a given vehicle or a given user, as examples. Many mobile radios are also referred to as portable radios, in that they are designed and configured to be relatively easily carried from place to place by respective users. Some portable radios are designed and configured to be worn, perhaps detachably so, on or about a user's shoulder, chest, hip, and/or the like. Many portable radios are designed and configured to be carried about by users in their respective pockets, purses, handbags, backpacks, and the like. And certainly numerous other examples and example aspects of mobile radios could be listed here.

One context in which effective and reliable wireless communications are quite important is the public-safety context. In that context and in others, it is sometimes the case that radio channels that were originally designed to be allocable to one mobile radio at a time have been subdivided into multiple channels that can be separately allocated to different mobile radios. In such an implementation, if a given radio channel has been sub-divided into two separately allocable, closely adjacent channels, it can occur that the uplink signal on a first one of those two channels is being received at a network base station at a power level that exceeds the power level at which the uplink signal on the second of those two channels is being received at the base station by such a degree as to block effective receipt by the base station of the uplink signal on the second channel. In such a scenario, from the perspective of a base station attempting to receive and decode the uplink signal on the second channel, the uplink signal on the first channel would often be referred to in the art as being "the blocking signal," while the uplink signal on the second channel would often be referred to in the art as being "the desired channel." Moreover, the uplink signal on the first channel would often be referred to in the art as being "the near signal," while the uplink signal on the second channel would often be referred to in the art as being "the far signal," though it is noted that these descriptors often but do not always accurately reflect actual relative distance from the receiving base station.

Moreover, although it is often the case that a desired signal can be properly obtained by applying a filter over a spectrum band that is centered on a center frequency of the desired signal and that is narrow enough in the frequency domain to limit the as-received power of the blocking signal enough to facilitate the obtaining of the desired signal, it can and does occur that the as-received power at the base station of the blocking signal exceeds the as-received power at the base station of the desired signal by such a degree as to preclude engineering a filter that would be both narrow enough to filter out a sufficient amount of energy from the blocking signal and wide enough to avoid degrading the ability to successfully obtain the desired signal.

For these reasons and others, there is a need for methods and systems for canceling a blocking signal to obtain a desired signal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
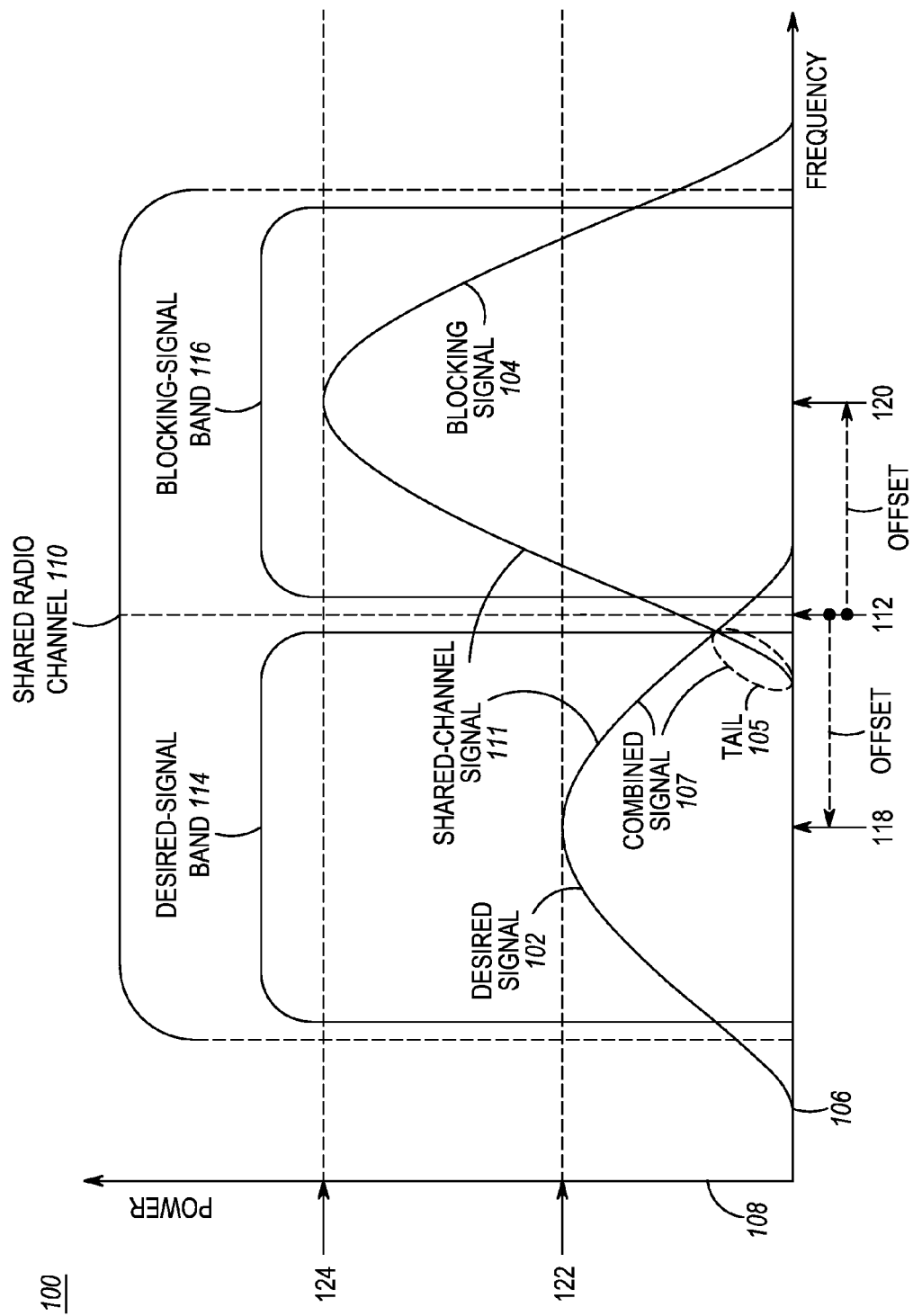
FIG. 1 is a first example graph, depicting an example desired signal and an example blocking signal, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for canceling a blocking signal to obtain a desired signal, in order to be able to receive the desired signal and use a demodulator to recover the information encoded in the desired signal. One embodiment takes the form of a process of producing a reference signal for canceling a blocking signal to obtain a desired signal. The blocking signal is centered in a blocking-signal band, and the desired signal is centered in a desired-signal band. The process includes receiving both the blocking signal and a set of blocking bits corresponding to a demodulation of the blocking signal. The process also includes generating a remodulated blocking signal at least in part by modulating the received set of blocking bits. The process further includes generating an estimated blocking signal at least in part by passing the remodulated blocking signal through a blocking-band bandpass filter, as well as generating an unconditioned reference signal at least in part by passing the remodulated blocking signal through a desired-band bandpass filter. The process further includes identifying one or more signal-parameter differences between the blocking signal and the estimated blocking signal, as well as generating a conditioned reference signal at least in part by applying one or more signal compensations to the unconditioned reference signal, where the one or more applied signal compensations are based at least in part on the one or more identified signal-parameter differences. The process also includes outputting the conditioned reference signal to a blocking-signal-canceling system.

Another embodiment takes the form of a system configured to produce a reference signal that is useable for canceling a blocking signal that is centered in a blocking-signal band to obtain a desired signal that is centered in a desired-signal band. The system is configured to receive as input both the blocking signal and a set of blocking bits corresponding to a demodulation of the blocking signal. The system includes a blocking-bits modulator that is configured to generate a remodulated blocking signal at least in part by modulating the set of blocking bits. The system also includes a blocking-band bandpass filter configured to generate an estimated blocking signal by filtering the remodulated blocking signal, as well as a desired-band bandpass filter configured to generate an unconditioned reference signal by filtering the remodulated blocking signal. The system includes a signal comparator that is configured to identify one or more signal-parameter differences between the blocking signal and the estimated blocking signal. The system includes a reference-signal conditioner that is configured to generate a conditioned reference signal at least in part by applying one or more signal compensations to the unconditioned reference signal, where the one or more applied signal compensations are based at least in part on the one or more identified signal-parameter differences. The reference-signal conditioner is also configured to output the conditioned reference signal to a reference-signal input of a blocking-signal-canceling system.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

In at least one embodiment, both the desired-signal band and the blocking-signal band are within a shared radio channel.

In at least one embodiment in which both the desired-signal band and the blocking-signal band are within a shared radio channel, the process further includes (i) receiving a shared-channel signal via the shared radio channel, where the shared-channel signal includes the desired signal and the blocking signal and (ii) processing the received shared-channel signal through one or more of a receiver-front-end filter, an analog-to-digital conversion filter, and a hardware-compensation filter.

In at least one embodiment in which both the desired-signal band and the blocking-signal band are within a shared radio channel, the shared radio channel is a 25-kilohertz- (kHz)-wide radio channel.

In at least one embodiment in which both the desired-signal band and the blocking-signal band are within a shared radio channel, one or both of the desired channel and the blocking channel are offset from a center frequency of the shared radio channel.

In at least one embodiment, the following functions are also carried out: receiving one or more error estimations corresponding to the demodulation of the blocking signal, and applying one or more adjustments to the remodulated blocking signal based at least in part on the one or more received error estimations. In at least one embodiment, the one or more error estimations comprises a deviation estimation. In at least one embodiment, the one or more error estimations comprises a frequency-error estimation.

In at least one embodiment, one of the identified signal-parameter differences between the blocking signal and the estimated blocking signal is a timing difference; and in at least one such embodiment, a timing compensation is applied to the unconditioned reference signal.

In at least one embodiment, the following function is also carried out: estimating a filter response in the blocking-signal band using the blocking signal and the estimated blocking signal; and in at least one such embodiment, the following function is also carried out: filtering the estimated blocking signal using a filter that is based at least in part on the estimated filter response.

In at least one embodiment, one of the identified signal-parameter differences between the blocking signal and the estimated blocking signal is a set of magnitude and phase differences; and in at least one such embodiment, a magnitude-and-phase-set compensation is applied to the unconditioned reference signal.

In at least one embodiment, the following function is also carried out: estimating a channel response of the blocking signal; in at least one such embodiment, a channel-response correction that is based at least in part on the estimated channel response is applied to the unconditioned reference signal.

In at least one embodiment, the blocking-signal-canceling system comprises an adaptive-noise-cancellation (ANC) system.

In at least one embodiment, the following function is also carried out: selectively enabling or disabling the blocking-signal-canceling system based at least in part on a near-far comparison of the desired signal and the blocking signal.

In at least one embodiment, the following function is also carried out: the blocking-signal-canceling system generating an estimated desired signal at least in part by using the conditioned reference signal to cancel the blocking signal to obtain the desired signal. In at least one such embodiment, the estimated desired signal is demodulated.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

FIG. 1 is a first example graph 100, depicting an example desired signal 102 and an example blocking signal 104, in accordance with at least one embodiment. The desired signal 102 is within a desired-signal band 114, and the blocking signal 104 is within a blocking-signal band 116. In the embodiment that is depicted in FIG. 1, both the desired-signal band 114 and the blocking-signal band 116 are within a shared radio channel 110. The horizontal axis 106 of the graph 100 corresponds to frequency, increasing from left to right, while the vertical axis 108 of the graph 100 corresponds to power (i.e., energy, signal strength), increasing from bottom to top.

In the depicted embodiment, a right tail (i.e., an upper-frequency portion (not separately numbered)) of the desired signal 102 crosses over into the blocking-signal band 116, and a left tail (i.e., a lower-frequency portion (numbered 105 and encompassed by the dashed oval)) of the blocking signal 104 crosses over into the desired-signal band 114. In many instances, the blocking signal 104 may have a shape that is more similar to that of the desired signal 102 (i.e., that is wider), in which case, due to the higher level of as-received power at the base station of the blocking signal 104 relative to the desired signal 102, the intrusion onto the desired signal 102 made by the left tail 105 of the blocking signal 104 would be even more pronounced than it is in the example situation that is depicted in FIG. 1. As a general matter, numerous different signals of numerous different shapes could be adjacent one another, and the depiction in FIG. 1 is one example presented by way of illustration. Moreover, in this disclosure, the desired signal 102 and the left tail 105 (of the blocking signal 104) are together referred to as the combined signal 107. Moreover, the desired signal 102 and the blocking signal 104 are together referred to as the shared-channel signal 111.

In at least one embodiment, a "shared radio channel" is a radio channel that has been allocated in connection with a Federal Communications Commission (FCC) band plan and that is being used for transmissions of multiple different signals from multiple different respective user terminals, as opposed to what is more the default usage (i.e., one signal from one user terminal per FCC-band-plan-allocated channel). The present systems and methods can be implemented with respect to shared radio channels and also with respect to adjacent FCC-band-plan-allocated channels (e.g., with respect to adjacent FCC-band-plan-allocated 12.5-kHz-wide channels). In at least one embodiment, a "shared radio channel" is a channel that is coupled into a receiver's front-end circuitry and that contains multiple individual signals (i.e., sub-channels) transmitted by multiple users.

The desired signal 102 is received at a power level 122, and the blocking signal 104 is received at a higher power level 124. The shared radio channel 110 has a center frequency 112. The desired signal 102 has a center frequency 118, and the blocking signal 104 has a center frequency 120. In the depicted embodiment, the center frequency 118 of the desired signal 102 is offset to the left of (i.e., less than) the center frequency 112 of the shared radio channel 110 by the same amount that the center frequency 120 of the blocking signal 104 is offset to the right of (i.e., greater than) the center frequency 112 of the shared radio channel 110. In at least one embodiment, the offsets could be different in magnitude. In at least one embodiment, one sub-channel in a shared radio channel is not offset from the center frequency of that shared radio channel while at least one other sub-channel in that shared radio channel is offset from the center frequency by some amount. And certainly numerous other example implementations could be listed here.

The scenario that is depicted in FIG. 1 may correspond to (i) a first mobile radio having been allocated the frequency 118 as its transmit channel, over which the first mobile radio is presently transmitting the desired signal 102 from a location that is relatively far from the receiving base station and (ii) a second mobile radio having been allocated the frequency 120 as its transmit channel, over which the second mobile radio is presently transmitting the blocking signal 104 from a location that is relatively close to the receiving base station. This scenario is presented by way of example and not limitation, as those of skill in the relevant art will appreciate that there are numerous possible scenarios that could give rise to a graph similar to the example graph 100. As but one example, the blocking signal could be to the left of (instead of to the right of) the desired signal.

Figure 2:
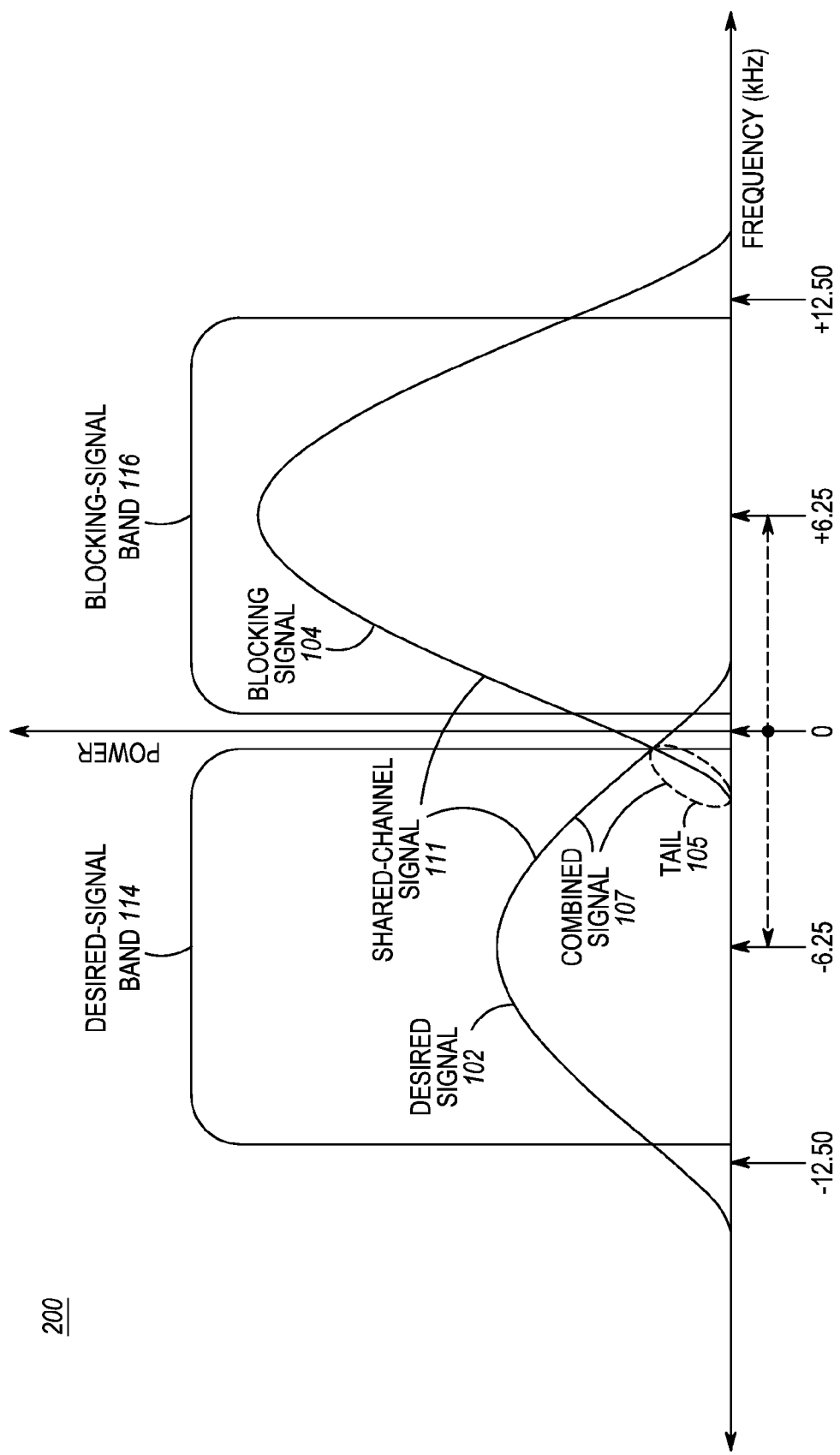
FIG. 2 is a second example graph, depicting the example desired signal and the example blocking signal of FIG. 1, in accordance with at least one embodiment.

FIG. 2 is a second example graph 200, depicting the desired signal 102 and the blocking signal 104 of FIG. 1, in accordance with at least one embodiment. Indeed, the graph 200 is quite similar to the graph 100, though the graph 200 depicts the center frequency 112 of the shared radio channel 110 as being the zero point on the horizontal axis, which the graph 200 specifies by way of example as being in kHz. The graph 200 corresponds to an example in which the shared radio channel 110 is a 25-kHz-wide radio channel. As in the graph 100, in the graph 200, the desired channel 102 (i.e., the center frequency 118 of the desired channel 102) is offset to the left of the center frequency 112 of the shared radio channel 110 by the same amount (in this case, 6.25 kHz) that the blocking signal 104 (i.e., the center frequency 120 of the blocking signal 104) is offset to the right of the center frequency 112 of the shared radio channel 110.

Those of skill in the art will understand that the graph 200 can be interpreted as showing the shared-channel signal 111 (which includes the desired signal 102 and the blocking signal 104) at baseband. Moreover, it is noted that reference to the desired signal 102 and the blocking signal 104 together forming the shared-channel signal 111 does not indicate that these two signals are combined and then transmitted by a single entity; rather, the term shared-channel signal is used herein to indicate that these two signals are both located within (i.e., they share) what is demarcated as being a single radio channel in a given wireless network (e.g., in an Association of Public-Safety Communications Officials (APCO) Project 25 (P25) wireless network).

Figure 3:
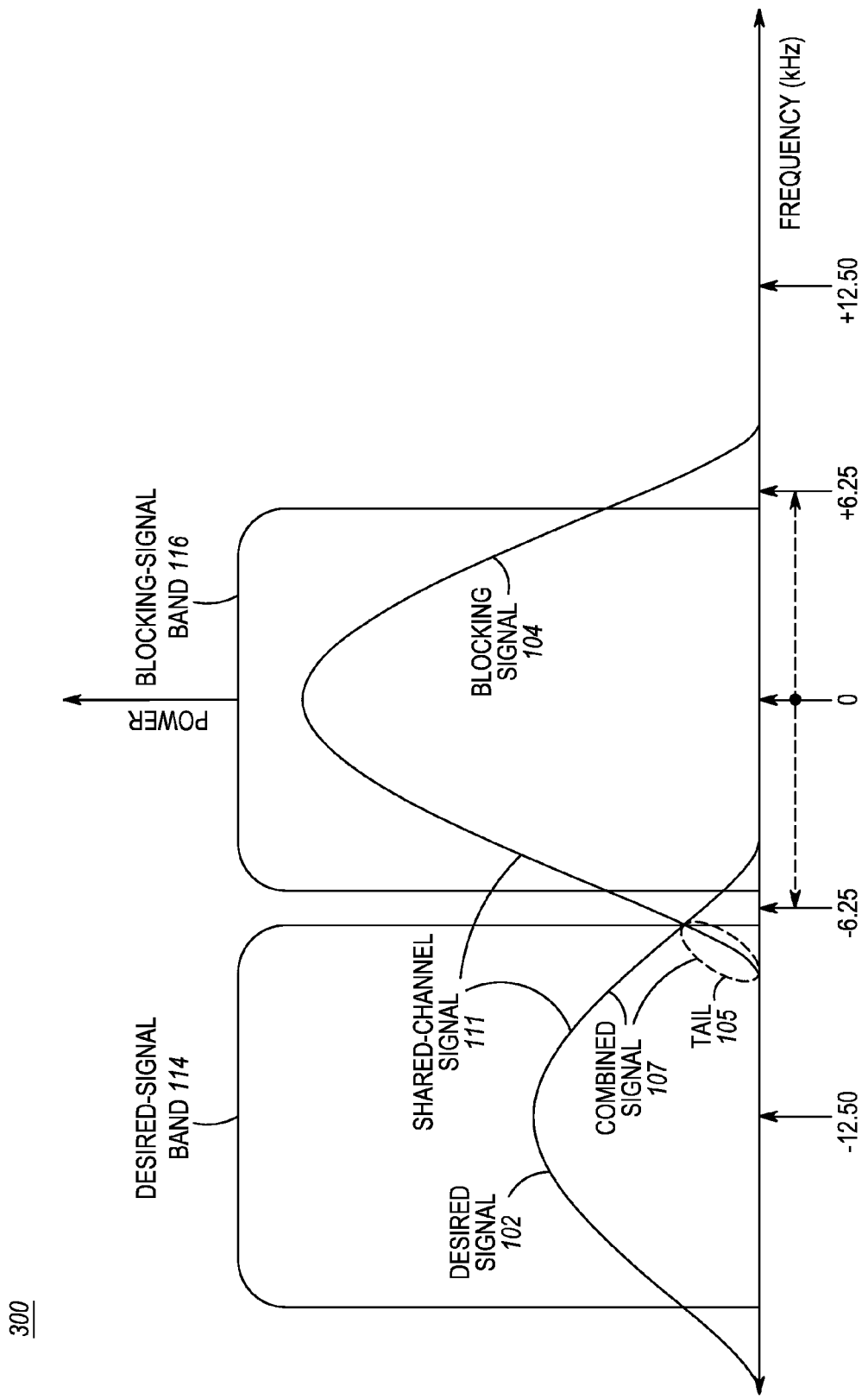
FIG. 3 is a third example graph, depicting the example desired signal and the example blocking signal of FIG. 1, in accordance with at least one embodiment.

FIG. 3 is a third example graph 300, depicting the desired signal 102 and the blocking signal 104 of FIG. 1, in accordance with at least one embodiment. The graph 300 is similar to the graph 200, other than that the graph 300 shows the above-referenced shared-channel signal 111—containing the desired signal 102 adjacent the blocking signal 104—having been shifted to the left (i.e., mixed down) by 6.25 kHz (as compared to FIG. 2). Thus, the graph 300 can be interpreted as showing the above-reference shared-channel signal 111 when the blocking signal 104 that is contained therein is at baseband (i.e., is centered at baseband).

Figure 4:
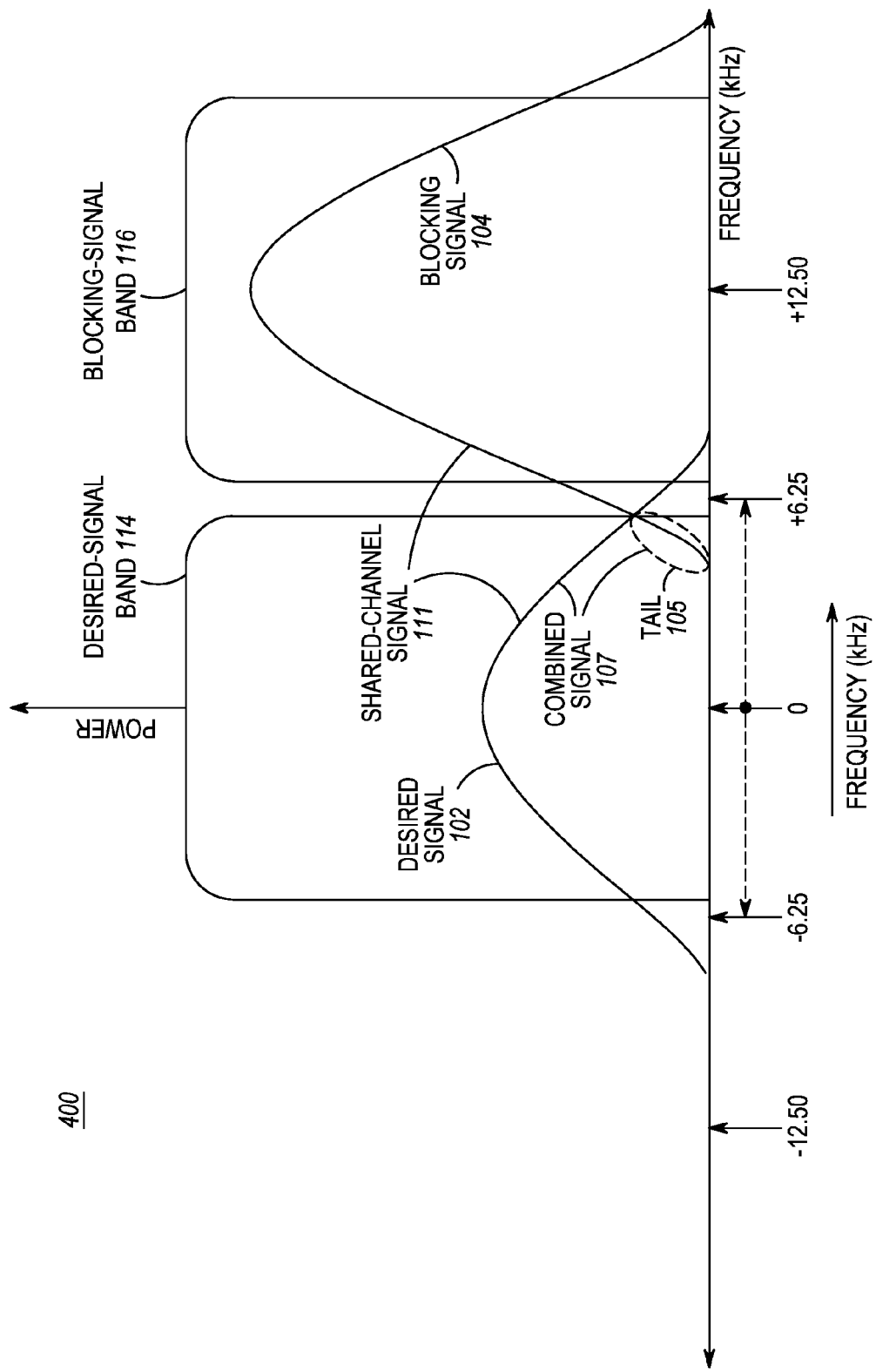
FIG. 4 is a fourth example graph, depicting the example desired signal and the example blocking signal of FIG. 1, in accordance with at least one embodiment.

FIG. 4 is a fourth example graph 400, depicting the desired signal 102 and the blocking signal 104 of FIG. 1, in accordance with at least one embodiment. In at least one sense, the graph 400 shows the opposite of what the graph 300 shows. That is, the graph 400 shows the above-referenced shared-channel signal 111—containing the desired signal 102 adjacent the blocking signal 104—having been shifted to the right (i.e., mixed up) by 6.25 kHz (again as compared to FIG. 2). Thus, the graph 400 can be interpreted as showing the above-referenced shared-channel signal when the desired signal 102 that is contained therein is at baseband (i.e., is centered at baseband). It can again be seen that the above-referenced left tail 105 of the blocking signal 104 extends into the desired-signal band 114.

Figure 5:
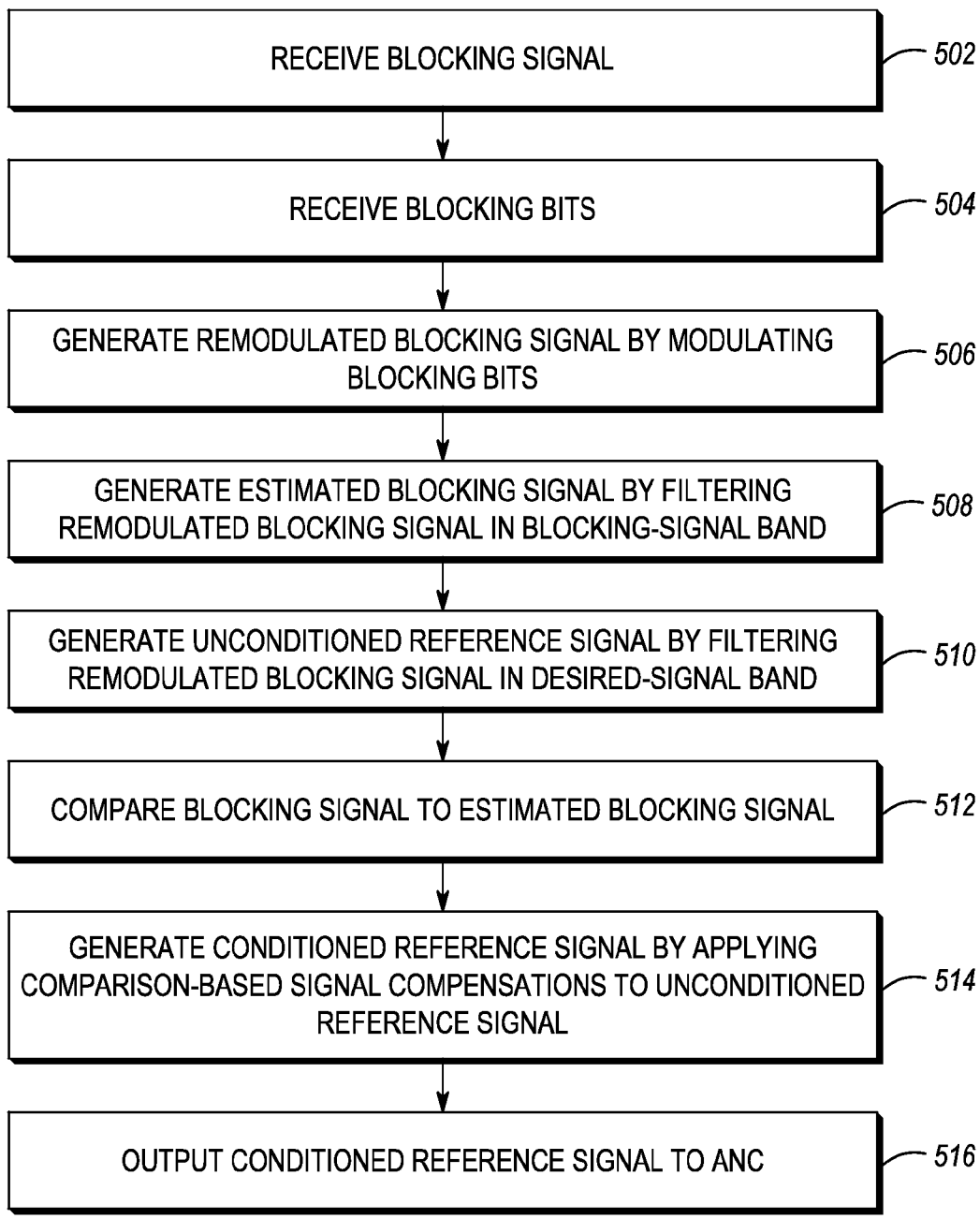
FIG. 5 is a flowchart of an example process, in accordance with at least one embodiment.

FIG. 5 is a flowchart of an example process 500, in accordance with at least one embodiment, of producing a reference signal for canceling a blocking signal (such as the blocking signal 104) to obtain a desired signal (such as the desired signal 102). The blocking signal is centered in a blocking-signal band (such as the blocking-signal band 116), and the desired signal is centered in a desired-signal band (such as the desired-signal band 114). And although the example process 500 is described herein with reference to the signals 102 and 104, the bands 114 and 116, etc. that are depicted in and described in connection with the various figures, this is purely for illustration and not by way of limitation. As depicted in FIG. 5, the example process includes steps 502-516, which are described below. Furthermore, for readability and illustration among other purposes, the example process 500 is described herein as being carried out by a reference-signal-generation system, one example of which is depicted in and described in connection with FIG. 6.

At step 502, the reference-signal-generation system receives the blocking signal 104. At step 504, the reference-signal-generation system receives a set of blocking bits corresponding to a demodulation of the blocking signal 104. At step 506, the reference-signal-generation system generates a remodulated blocking signal at least in part by modulating the received set of blocking bits.

At step 508, the reference-signal-generation system generates an estimated blocking signal at least in part by passing the remodulated blocking signal through a blocking-band bandpass filter. At step 510, the reference-signal-generation system generates an unconditioned reference signal at least in part by passing the remodulated blocking signal through a desired-band bandpass filter. At step 512, the reference-signal-generation system identifies one or more signal-parameter differences between the blocking signal and the estimated blocking signal. At step 514, the reference-signal-generation system generates a conditioned reference signal at least in part by applying one or more signal compensations to the unconditioned reference signal, the one or more applied signal compensations being based at least in part on the one or more identified signal-parameter differences.

At step 516, the reference-signal-generation system outputs the conditioned reference signal to a blocking-signal-canceling system (e.g., an ANC system as mentioned by way of example in the block 516 of the example process 500), which may use the conditioned reference signal to cancel the blocking signal 104 (i.e., the left tail 105 of the blocking signal 104) to obtain the desired signal 102. The blocking-signal-canceling system may output the resulting signal to one or more components, one example being a demodulation system or circuit that could then demodulate that resulting signal to obtain the information encoded in the desired signal 102. The various steps of the example process 500 are discussed throughout the below descriptions that pertain to FIGS. 6-15.

Figure 6:
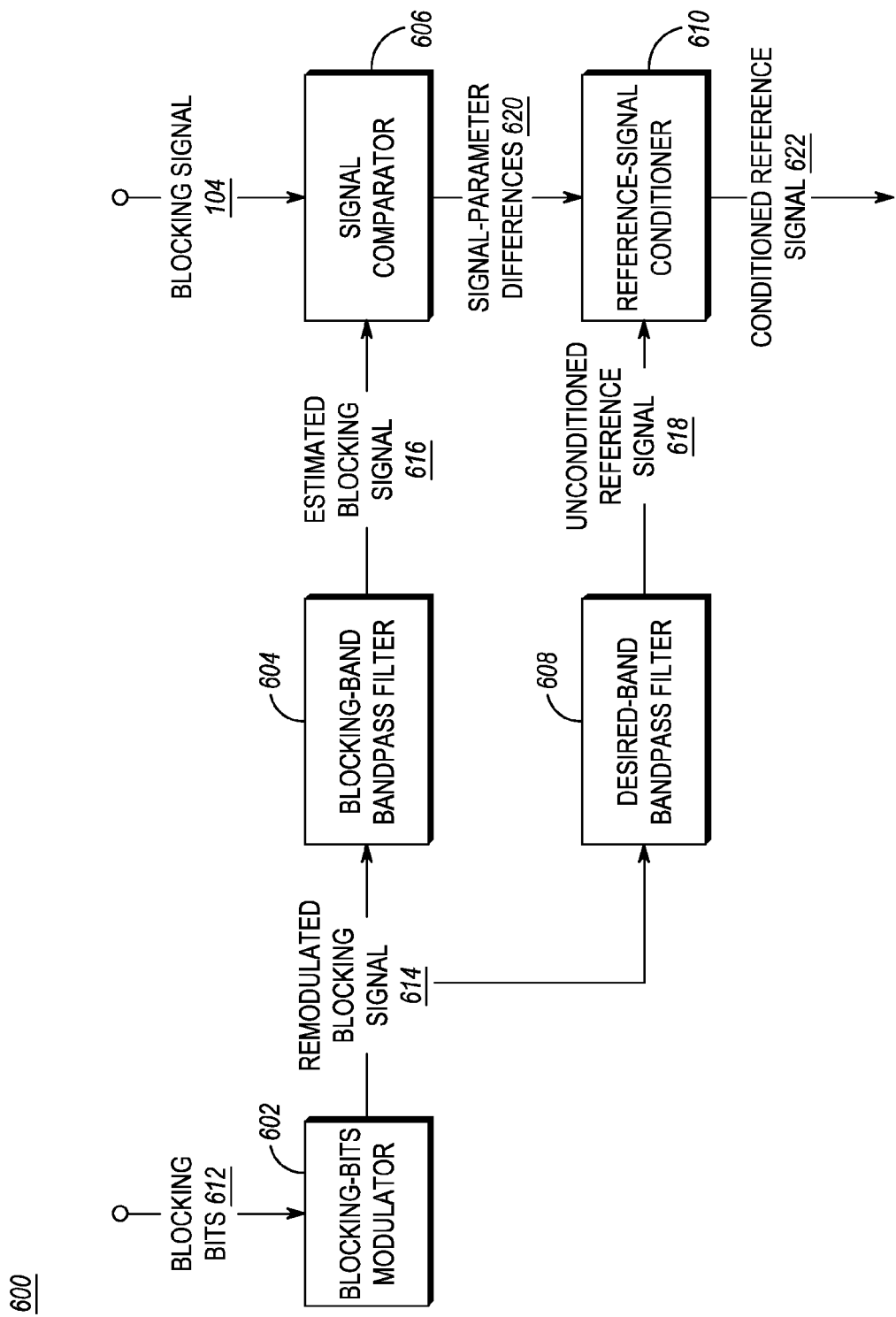
FIG. 6 is a diagram of a first example reference-signal-generation system, in accordance with at least one embodiment.

FIG. 6 is a diagram of a first example reference-signal-generation system 600, in accordance with at least one embodiment. The reference-signal-generation system 600 is configured to produce a reference signal that is useable for canceling a blocking signal (e.g., the blocking signal 104) that is centered in a blocking-signal band (e.g., the blocking-signal band 116) to obtain a desired signal (e.g., the desired signal 102) that is centered in a desired-signal band (e.g., the desired-signal band 114). The reference-signal-generation system 600 is described herein by way of example in the context of the example signals, bands, etc. that are also described in this disclosure. As can be seen in FIG. 6, the reference-signal-generation system 600 receives as input (i) the blocking signal 104 and (ii) blocking bits 612, which correspond to (i.e., represent) a demodulation of the blocking signal 104. The reference-signal-generation system 600 includes a blocking-bits modulator 602, a blocking-band bandpass filter 604, a desired-band bandpass filter 608, a signal comparator 606, and a reference-signal conditioner 610. Each of these is a circuit component that is configured (i.e., arranged, programmed, and the like) to perform functions as described herein.

The blocking-bits modulator 602 is configured to receive the blocking bits 612, and modulate the blocking bits 612 so as to generate a remodulated blocking signal 614. In at least one embodiment, the blocking-bits modulator 602 generates an APCO P25 (Phase 1) signal; in at least one embodiment, the blocking-bits modulator 602 generates an APCO P25 (Phase 2) signal. And certainly other modulation types could be used as well. As a general matter, the blocking-bits modulator 602 is configured to output a signal having a modulation that matches that of the blocking signal 104. The blocking-band bandpass filter 604 is configured to receive the remodulated blocking signal 614 from the blocking-bits modulator 602, filter out components of that signal that are outside of the blocking-signal band 116, and accordingly output an estimated blocking signal 616. The desired-band bandpass filter 608 is configured to receive the remodulated blocking signal 614 from the blocking-bits modulator 602, filter out components of that signal that are outside of the desired-signal band 114, and output an unconditioned reference signal 618.

The signal comparator 606 is configured to receive both (i) the estimated blocking signal 616 from the blocking-band bandpass filter 604 and (ii) the blocking signal 104, identify one or more signal-parameter differences between the blocking signal 104 and the estimated blocking signal 616, and accordingly output an indication 620 of those one or more identified signal-parameter differences.

The reference-signal conditioner 610 is configured to receive both (i) the unconditioned reference signal 618 from the desired-band bandpass filter 608 and (ii) the signal-parameter-differences indication 620 from the signal comparator 606. The reference-signal conditioner 610 is further configured to generate a conditioned reference signal 622 at least in part by applying one or more signal compensations to the unconditioned reference signal 618, where those one or more applied signal compensations are based at least in part on the one or more identified signal-parameter differences conveyed by the signal-parameter-differences indication 620. The reference-signal conditioner 610 is also configured to output the conditioned reference signal 622 to a reference-signal input of a blocking-signal-canceling system (e.g., an ANC system).

In at least one embodiment, one of the signal-parameter differences between the blocking signal 104 and the estimated blocking signal 616 that is identified by the signal comparator 606 is a set of magnitude and phase differences between the blocking signal 104 and the estimated blocking signal 616; accordingly, in at least one such embodiment, one of the signal compensations that the reference-signal conditioner 610 applies to the unconditioned reference signal 618 is a magnitude-and-phase-set compensation.

Figure 7:
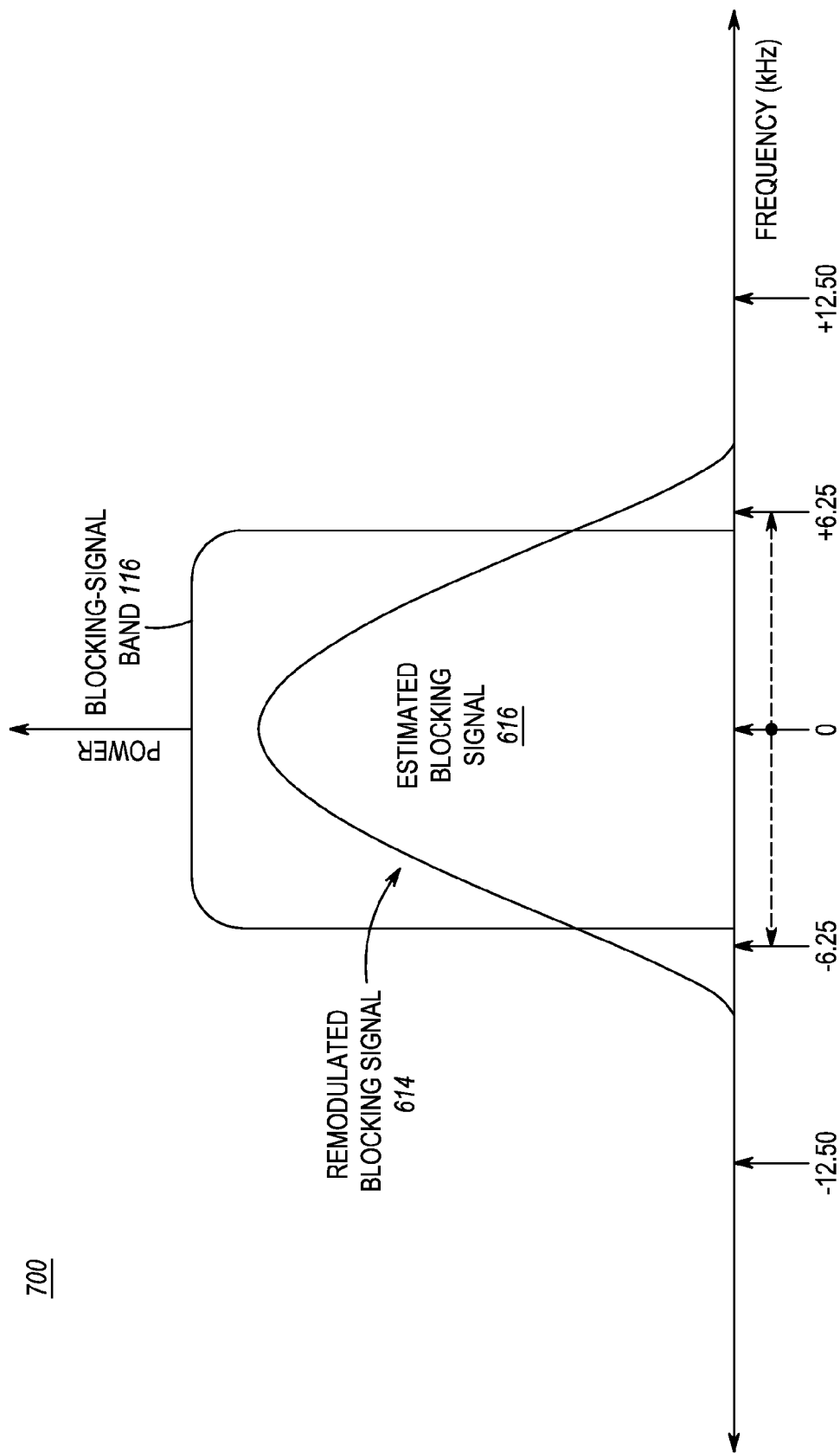
FIG. 7 is a fifth example graph, depicting an example estimated blocking signal that corresponds to an example remodulation of the example blocking signal of FIG. 1, in accordance with at least one embodiment.

FIG. 7 is a fifth example graph 700, depicting the estimated blocking signal 616, which corresponds to an example remodulation of the example blocking signal 104, in accordance with at least one embodiment. The graph 700 is representative of the function of the above-described blocking-band bandpass filter 604 of the reference-signal-generation system 600 of FIG. 6. As described above, the blocking-band bandpass filter 604 receives the remodulated blocking signal 614 from the blocking-bits modulator 602, and generates the estimated blocking signal 616 by filtering the remodulated blocking signal 614 in the blocking-signal band 116.

Thus, it can be seen in the graph 700 that the estimated blocking signal 616 corresponds to the portion of the remodulated blocking signal 614 (when centered at baseband) that is within the blocking-signal band 116 (when centered at baseband), and further that the estimated blocking signal 616 approximates the portion of the blocking signal 104 (when centered at baseband) that is within the blocking-signal band 116 (when centered at baseband) in the graph 300 of FIG. 3, though without the right tail of the desired signal 102.

Figure 8:
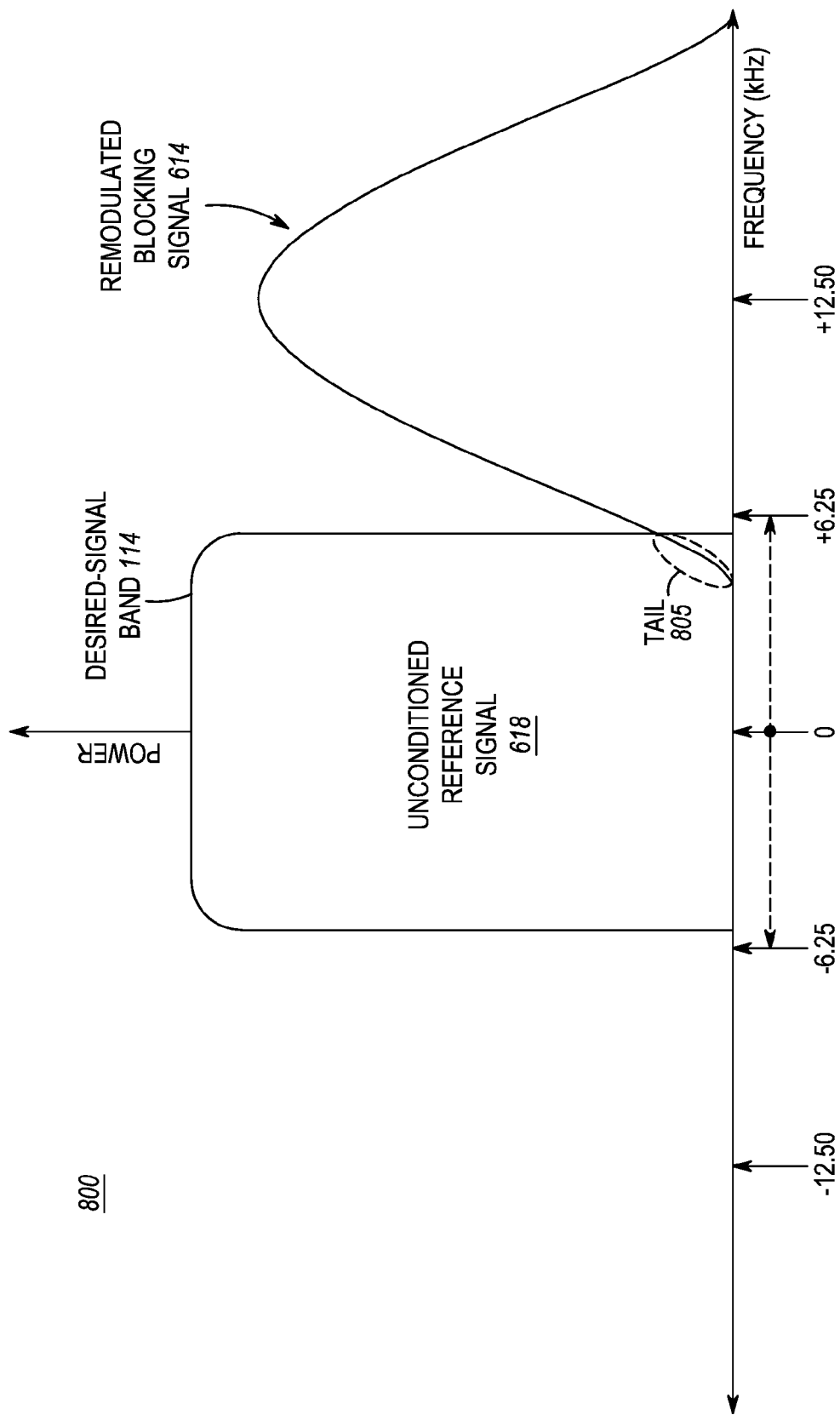
FIG. 8 is a sixth example graph, depicting an example unconditioned reference signal that also corresponds to the example remodulation of the example blocking signal of FIG. 1, in accordance with at least one embodiment.

FIG. 8 is a sixth example graph 800, depicting the example unconditioned reference signal 618, which also corresponds (though in a different way than does the estimated blocking signal 616) to the example remodulation of the example blocking signal 104, in accordance with at least one embodiment. The graph 800 is representative of the function of the above-described desired-band bandpass filter 608 of the reference-signal-generation system 600 of FIG. 6. As described above, the desired-band bandpass filter 608 receives the remodulated blocking signal 614 from the blocking-bits modulator 602, and generates the unconditioned reference signal 618 by filtering the remodulated blocking signal 614 in the desired-signal band 114.

Thus, it can be seen in the graph 800 that the unconditioned reference signal 618 corresponds to the portion of the remodulated blocking signal 614 (when centered two frequency offsets (12.50 kHz in this example) to the right of (i.e., above) baseband) that is within the desired-signal band 114 (when centered at baseband), and further that the unconditioned reference signal 618 approximates the portion of the blocking signal 104 (when located where it lies in the shared-channel signal 111 when the desired signal 102 is centered at baseband) that is within the desired-signal band 114 (when centered at baseband) in the graph 400 of FIG. 4. That is, the left tail 805 in the graph 800 approximates the left tail 105 in the graph 400 in both shape and offset from baseband.

Figure 9:
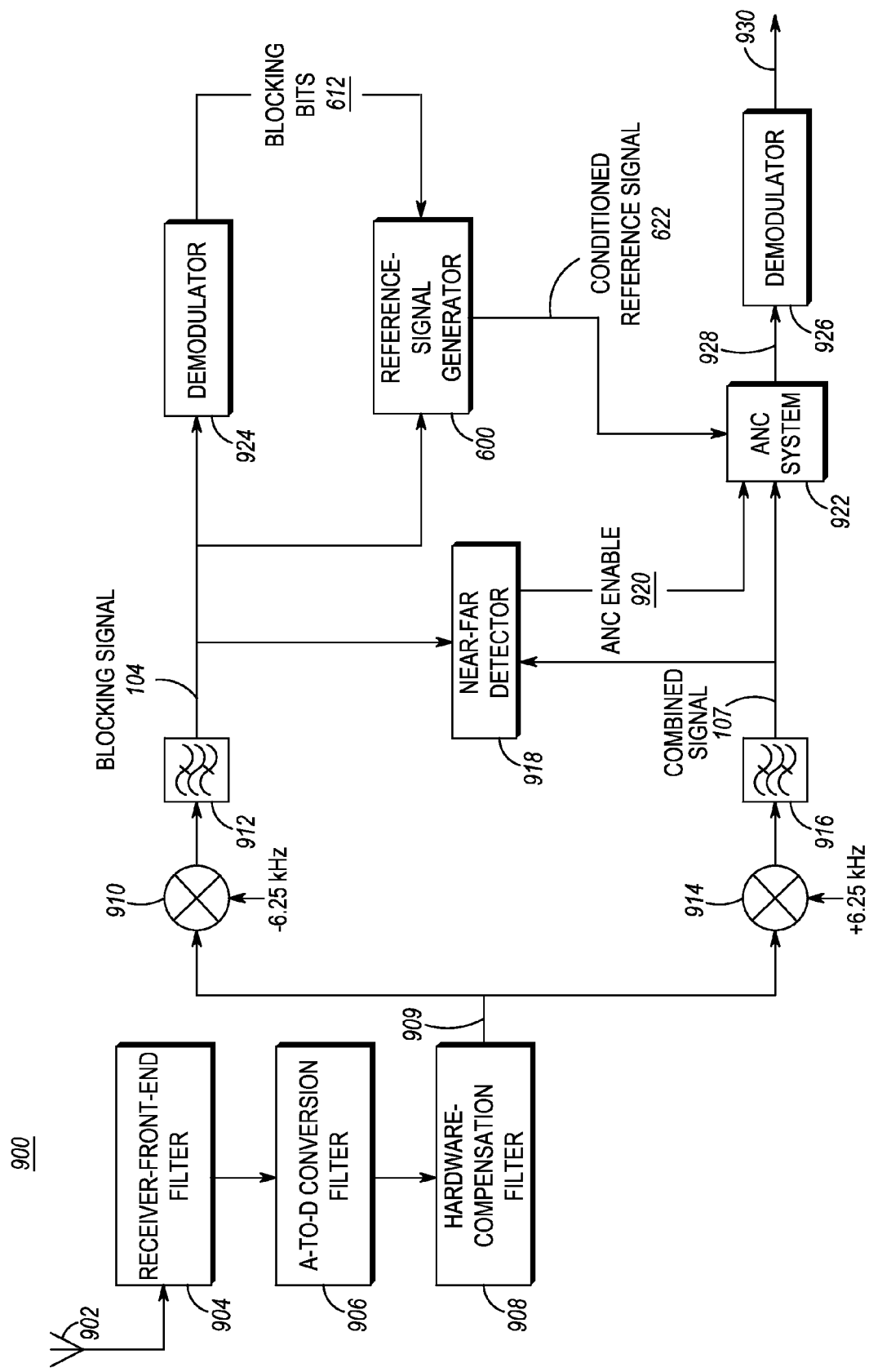
FIG. 9 is a diagram of a first example receiver system, which includes the first example reference-signal-generation system of FIG. 6, in accordance with at least one embodiment.
Figure 10:
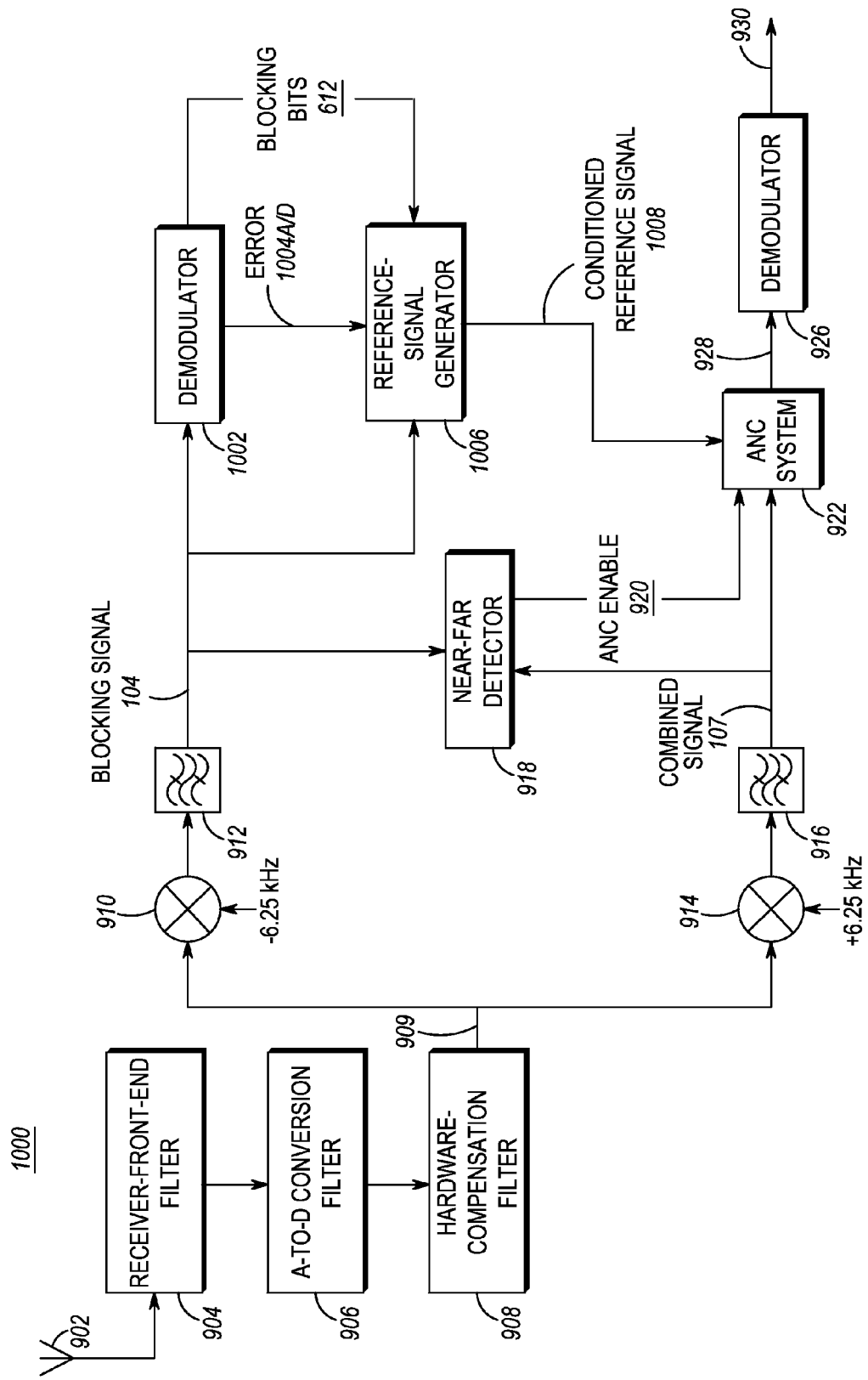
FIG. 10 is a diagram of a second example receiver system, in accordance with at least one embodiment.

The above descriptions of FIGS. 5-8 (along with FIGS. 5-8 themselves) pertain—without a great deal of description of any larger context—to embodiments of the present systems and methods for canceling a blocking signal to obtain a desired signal (in order to be able to successfully receive and demodulate the desired signal). FIGS. 9 and 10, and to some extent FIG. 15, and their associated descriptions below provide two different example larger contexts, while FIGS. 11-14 and their associated descriptions below provide additional examples of embodiments of reference-signal-generation systems in accordance with the present systems and methods.

FIG. 9 is a diagram of a first example receiver system 900, which includes the reference-signal-generation system 600 of FIG. 6 (labeled "reference-signal generator 600" in FIG. 9), in accordance with at least one embodiment. The receiver system 900 includes an antenna 902 at which a shared-channel signal, such as the shared-channel signal 111 containing the desired signal 102 adjacent the blocking signal 104, is received. The received shared-channel signal is serially passed from the antenna 902 through a receiver-front-end filter 904, an analog-to-digital conversion filter 906, and a hardware-compensation filter 908, which outputs the resulting processed shared-channel signal 909 to both a mixer 910 and a mixer 914.

The mixer 910 shifts the processed shared-channel signal 909 to the left (i.e., mixes the processed shared-channel signal 909 down) by one frequency offset (i.e., 6.25 kHz in this example) so as to position the processed shared-channel signal 909 such that the blocking signal 104 contained therein is centered at baseband, and then outputs that left-shifted signal to a bandpass filter 912, which in at least one embodiment has the same response as the blocking-band bandpass filter 604 of FIG. 6. The bandpass filter 912 outputs the blocking signal 104 (i.e., a bandpass-filtered version of the blocking signal 104) to all three of the reference-signal generation system 600, a near-far detector 918, and a demodulator 924.

The mixer 914 shifts the processed shared-channel signal 909 to the right (i.e., mixes the processed shared-channel signal 909 up) by one frequency offset (i.e., 6.25 kHz in this example) so as to position that processed shared-channel signal 909 such that the desired signal 102 (and indeed the combined signal 107) contained therein is centered at baseband, and then outputs that right-shifted signal to a bandpass filter 916, which in at least one embodiment has the same response as the desired-band bandpass filter 608 of FIG. 6. The bandpass filter 916 outputs the combined signal 107 (i.e., a bandpass-filtered version of the combined signal 107 (which, again, includes both the desired signal 102 and the left tail 105 of the blocking signal 104)) to both the near-far detector 918 and an ANC system 922. It will be understood by those having skill in the relevant art that the ANC system 922, which is depicted in both FIG. 9 and FIG. 10, is an example type of blocking-signal-canceling system, and that other types of blocking-signal-canceling systems (e.g., circuit elements, combinations of circuit elements, and the like) could be used.

The near-far detector 918 receives both (i) the blocking signal 104 from the bandpass filter 912 and (ii) the combined signal 107 from the bandpass filter 916. In at least one embodiment, the near-far detector 918 compares a magnitude (e.g., an as-received power level, signal strength, or the like) of the blocking signal 104 with a magnitude of the combined signal 107 (and therefore with a magnitude of the desired signal 102). The near-far detector 918 may then compute a difference between those two magnitudes, and then compare that computed difference with a threshold. In at least one embodiment, if the computed difference exceeds that threshold, the near-far detector 918 sets its output signal (i.e., the ANC-enable signal 920) to a first value (e.g., 1); and if the computed difference does not exceed that threshold, the near-far detector 918 sets its output signal to a second value (e.g., 0).

Thus, the near-far detector 918 selectively enables and disables the ANC system 922 based on a near-far comparison of (i) the combined signal 107 (as a proxy for the desired signal 102) and (ii) the blocking signal 104, since those two signals having a relatively large disparity between them with respect to as-received signal strength tends to indicate that the stronger of the two signals is being transmitted from a location that is relatively near the receiving base station and that the weaker of the two signals is being transmitted from a location that is relatively far from the receiving base station. And certainly factors other than location and relative distance from the receiving base station (e.g., being indoors vs. being outdoors) could result in disparate as-received signal strengths, and thus as used herein, "near-far" should be read essentially as "strong-weak," though "near-far" is used herein as it is in the art as a broad characterization for situations in which one signal has a significantly higher as-received signal strength than an adjacent signal.

The demodulator 924 receives the blocking signal 104 from the bandpass filter 912, generates the blocking bits 612 by demodulating the blocking signal 104, and outputs the generated blocking bits 612 to the reference-signal-generation system 600. In at least one embodiment, the demodulator 924 (and the demodulator 1002 in the below description of FIG. 10) is carrying out what is known in the relevant art as frequency-shift-keying (FSK) demodulation, and accordingly the blocking-bits modulator 602 of FIG. 6 (and the blocking-bits modulator 1102 of FIG. 11) is carrying out FSK modulation. The blocking bits 612 could take the form of 1s and 0s, but could instead take other forms such as log-likelihood ratios (LLRs) as one example. And as described above, the reference-signal generation system 600 receives the blocking signal 104 and the blocking bits 612, and outputs the conditioned reference signal 622. As is further described below in connection with at least FIG. 15, the ANC system 922 receives (i) the ANC-enable signal 920 from the near-far detector 918, (ii) the combined signal 107 from the bandpass filter 916, and (iii) the conditioned reference signal 622 from the reference-signal-generation system 600, and outputs a signal 928 to a demodulator 926, which (i) demodulates the signal 928 and (ii) outputs a demodulated signal 930 that is representative of the information contained in the desired signal 102.

FIG. 10 is a diagram of a second example receiver system 1000, in accordance with at least one embodiment. The receiver system 1000 of FIG. 10 is quite similar to the receiver system 900 of FIG. 9, and therefore is not described in nearly as much detail. The only difference between the receiver system 1000 and the receiver system 900 is that, in the receiver system 900 of FIG. 9, the demodulator 924 outputs the blocking bits 612 to the reference-signal generation system 600 of FIG. 6, while in the receiver system 1000 of FIG. 10, the demodulator 1002 outputs both the blocking bits 612 and an error signal 1004 A/D to a reference-signal generation system 1006, which is described more fully below in connection with FIG. 11. It is noted that the "A/D" labeling of the error signal 1004A/D does not represent analog-to-digital conversion, but instead indicates in this disclosure that the error signal 1004A/D represents error information in one or both of the analog domain and the digital domain, where that error information is detected in the blocking signal 104 by the demodulator 1002. In the below description of FIG. 11, the error signal 1004 A/D appears as two separate signals: an analog-error signal 1004A (reflecting error in the analog domain) and a digital-error signal 1004D (reflecting error in the digital domain). Various examples of such error information are also discussed more fully below in connection with various figures; some such examples include the deviation-estimate signal 1206 and the frequency-error-estimation signal 1210 in FIG. 12, and corresponding signals 1406 and 1410 in FIG. 14. The reference-signal generation system 1006 outputs a conditioned reference signal 1008 to the ANC system 922.

Figure 11:
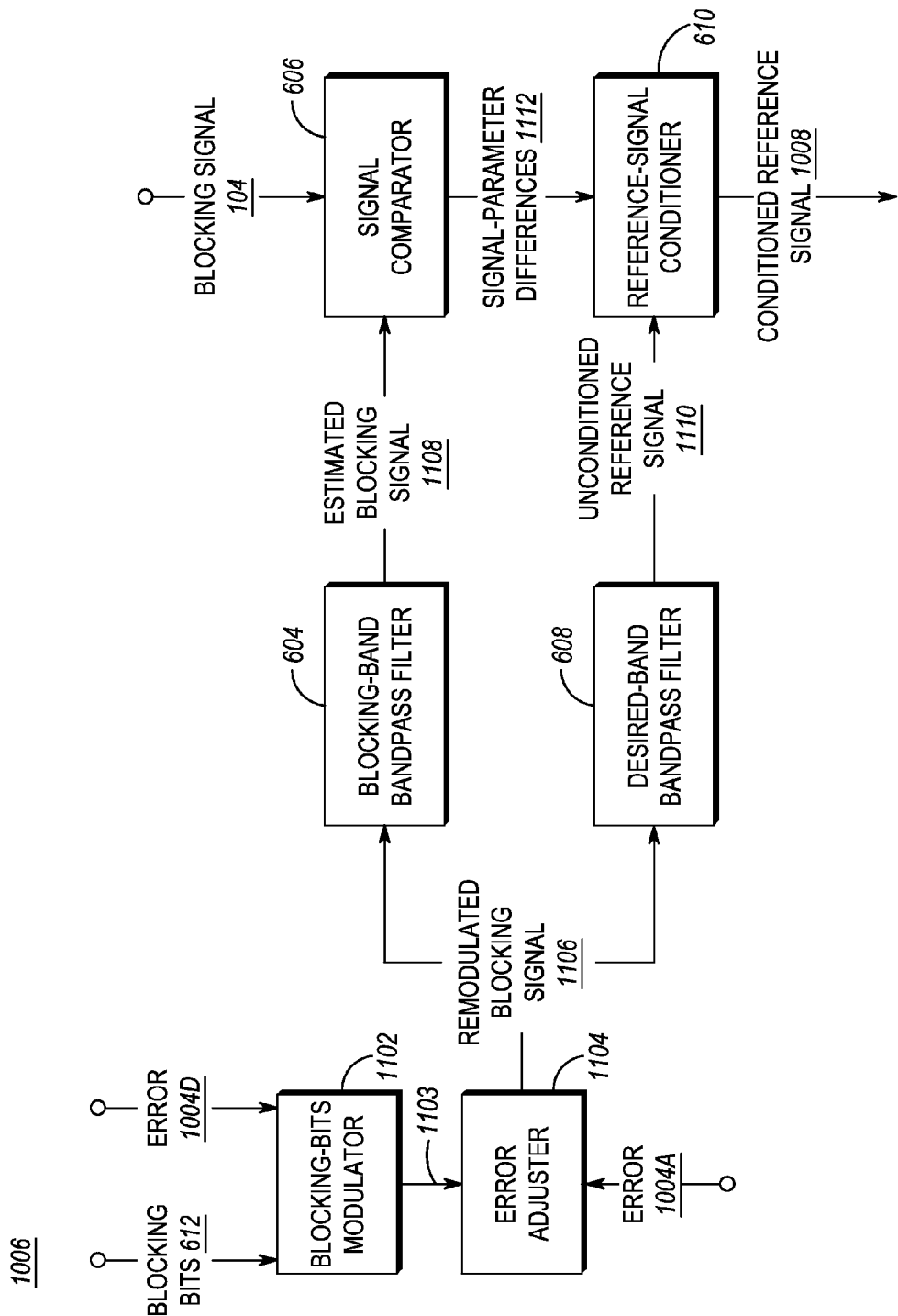
FIG. 11 is a diagram of a second example reference-signal-generation system, which is part of the second example receiver system of FIG. 10, in accordance with at least one embodiment.

FIG. 11 is a diagram of the second example reference-signal-generation system 1006, which is part of the second example receiver system 1000 of FIG. 10, in accordance with at least one embodiment. The reference-signal generation system 1006 is similar in a number of ways to the reference-signal generation system 600, and thus is not described here in as great of detail. The signals and circuit elements that are common to both the reference-signal generation system 600 and the reference-signal generation system 1006 are the blocking signal 104, the blocking bits 612, the blocking-band bandpass filter 604, the signal comparator 606, the desired-band bandpass filter 608, and the reference-signal conditioner 610.

There are also a number of signals and circuit elements that are present in the reference-signal generation system 1006 of FIG. 11 that are not present in and/or different from certain corresponding signals and circuit elements in the reference-signal generation system 600. The reference-signal generation system 1006 includes a blocking-bits modulator 1102 that receives not only the blocking bits 612, but also the digital-error signal 1004D, which pertains to digital-domain error detected by the demodulator 1002 while the demodulator 1002 was demodulating the blocking signal 104. The blocking-bits modulator 1102 applies the digital-error signal 1004D to the blocking bits 612, and outputs a digital-error-adjusted blocking-bits signal 1103.

The reference-signal generation system 1006 also includes a circuit element referred to herein as an error adjuster 1104, which receives (i) the digital-error-adjusted blocking-bits signal 1103 from the blocking-bits modulator 1102 and (ii) the analog-error signal 1004A, which pertains to analog-domain error detected by the demodulator 1002 while the demodulator 1002 was demodulating the blocking signal 104. The error adjuster 1104 generates a remodulated blocking signal 1106 at least in part by applying the analog-error signal 1004A to the digital-error-adjusted blocking-bits signal 1103, and outputs the remodulated blocking signal 1106 to both the blocking-band bandpass filter 604 and the desired-band bandpass filter 608.

Thus, taken together, the blocking-bits modulator 1102 and the error adjuster 1104 perform functions including (i) receiving one or more error estimations (i.e., the digital-error signal 1004D and the analog-error signal 1004A) corresponding to the demodulation of the blocking signal 104 and (ii) applying one or more adjustments to the remodulated blocking signal based at least in part on the one or more received error estimations (by generating the digital-error-adjusted blocking-bits signal 1103 and then the remodulated blocking signal 1106).

Moreover, it is noted that, in some embodiments, only digital-domain error information (i.e., not analog-domain error information) is processed in the generation of the remodulated blocking signal 1106 from the blocking bits 612; similarly, in other embodiments, only analog-domain error information (i.e., not digital-domain error information) is processed in the generation of the remodulated blocking signal 1106 from the blocking bits 612. Moreover, taken together, FIGS. 6 and 9 show that, in some embodiments, neither type of error information is processed in the generation of a remodulated blocking signal (which is labeled 614 in FIG. 6). Furthermore, taken together, FIGS. 10 and 11 show that, in some embodiments, both digital-domain error information and analog-domain error information from the demodulation of the blocking signal 104 are processed in the generation of a remodulated blocking signal (which is labeled 1106 in FIG. 11) from the blocking bits 612.

The blocking-band bandpass filter 604 filters the remodulated blocking signal 1106 in the blocking-signal band 114 and outputs an estimated blocking signal 1108. The signal comparator 606 receives (i) the estimated blocking signal 1108 from the blocking-band bandpass filter 604 and (ii) the blocking signal 104, and accordingly outputs a signal-parameter-differences signal 1112. The desired-band bandpass filter 608 filters the remodulated blocking signal 1106 in the desired-signal band 114 and outputs an unconditioned reference signal 1110. The reference-signal conditioner 610 receives (i) the signal-parameters-differences signal 1112 from the signal comparator 606 and (ii) the unconditioned reference signal 1110 from the desired-band bandpass filter 608, generates the conditioned reference signal 1008 at least in part by applying the signal-parameters-differences signal 1112 to the unconditioned reference signal 1110, and outputs that generated conditioned reference signal 1008.

Figure 12:
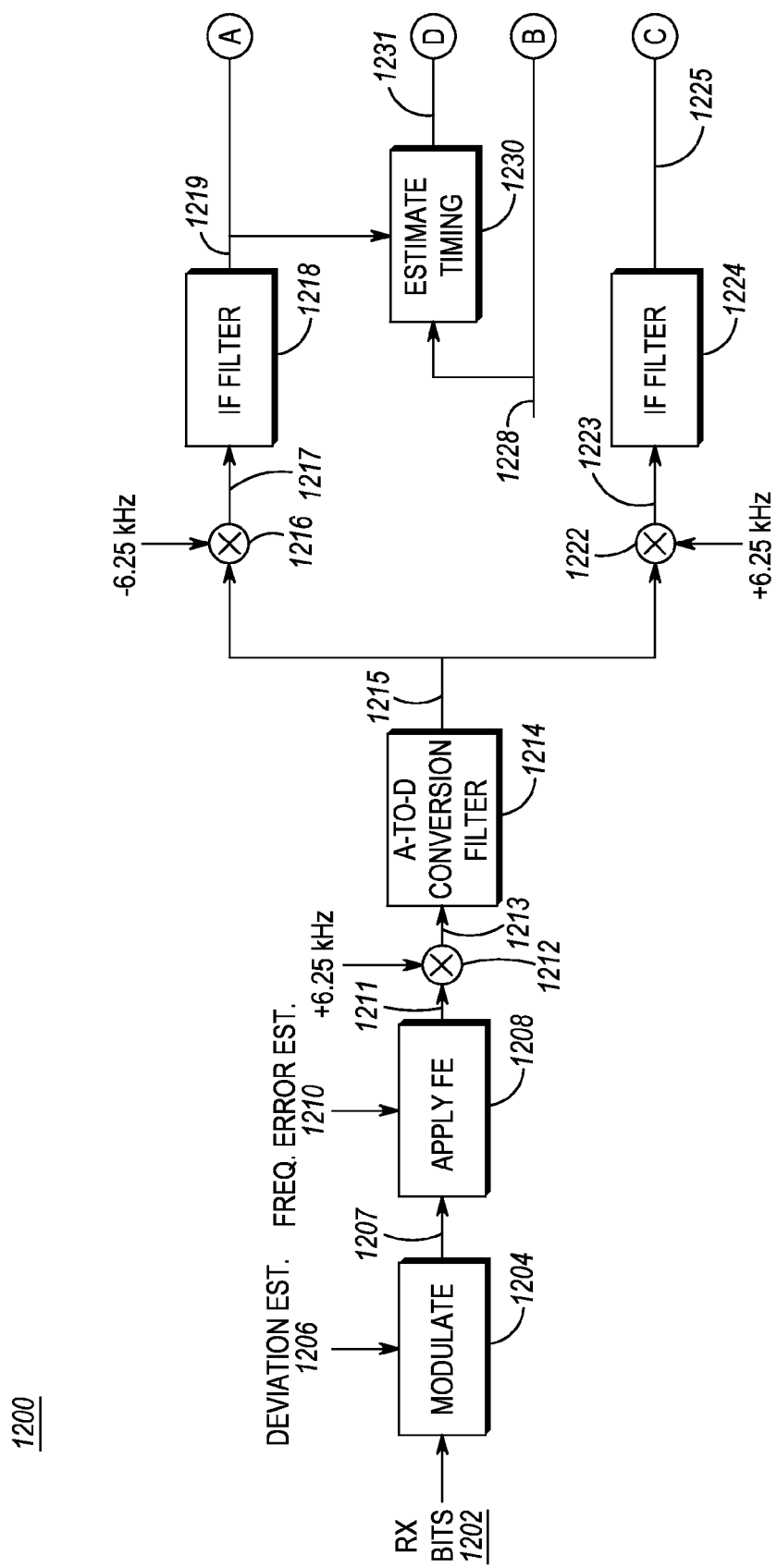
FIGS. 12 and 13 together form a diagram of a third example reference-signal-generation system, in accordance with at least one embodiment.
Figure 13:
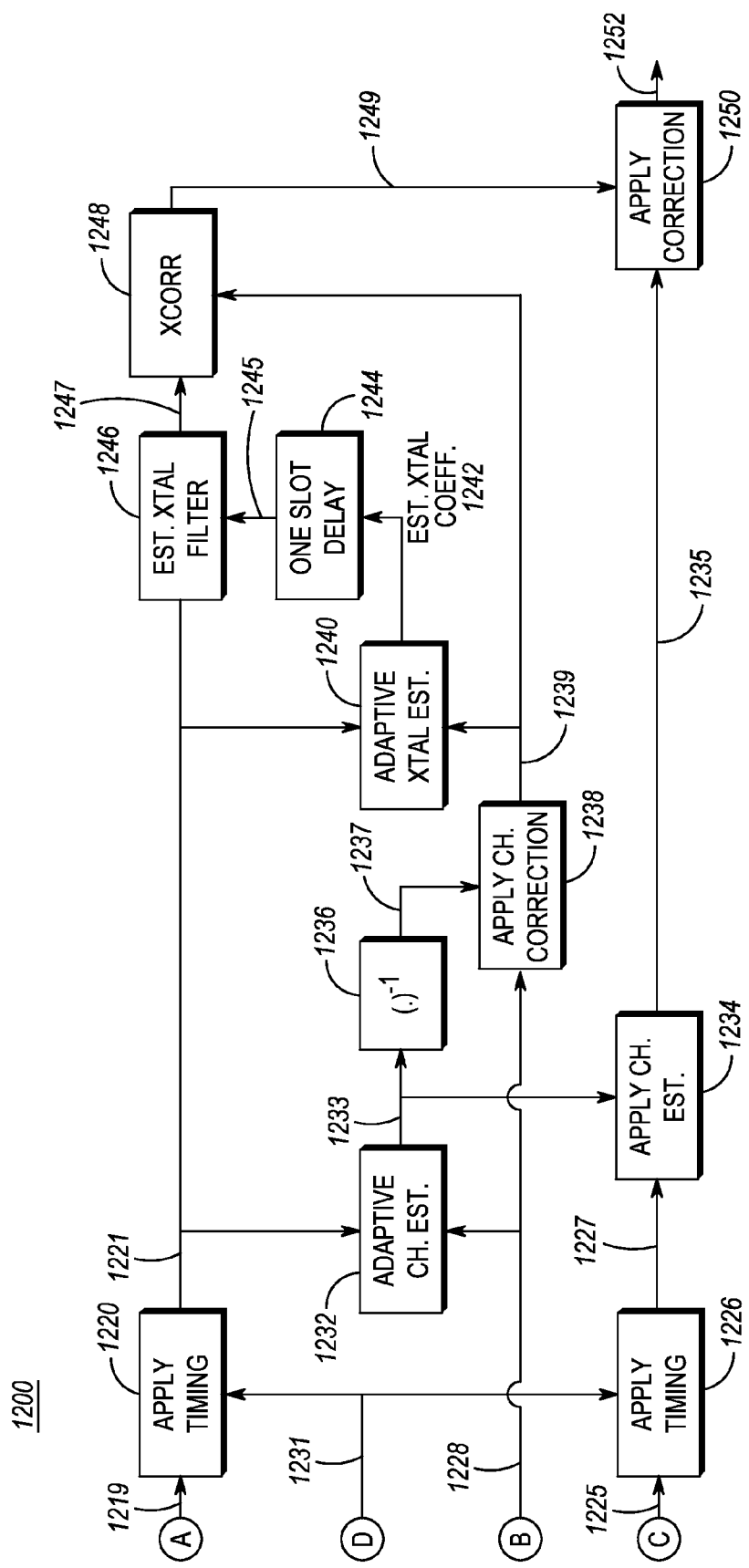

FIGS. 12 and 13 together form a diagram of a third example reference-signal-generation system 1200, in accordance with at least one embodiment.

The reference-signal-generation system 1200 includes a modulate block 1204 that receives bits 1202 corresponding to a demodulation of a blocking signal 1228. The modulate block 1204 modulates the bits 1202 while also applying thereto a deviation-estimate signal 1206, and outputs the result 1207 to an apply-frequency-error block 1208. The apply-frequency-error block 1208 receives and applies a frequency-error-estimation signal 1210 and outputs the result 1211 to a mixer 1212, which mixes the signal 1211 up by 6.25 kHz. In at least one embodiment, the deviation-estimate signal 1206 and the frequency-error-estimation signal 1210 are both obtained during a demodulation of the blocking signal, where that demodulation produced the bits 1202. In at least one embodiment, the deviation-estimate signal 1206 reflects an FSK-modulation deviation error detected during demodulation of the blocking signal (i.e., error with respect to the magnitude of the frequency shift that was used to encode the data in the blocking signal). In at least one embodiment, the frequency-error-estimation signal 1210 reflects any error detected in the value of the carrier frequency of the blocking signal.

The output 1213 of the mixer 1212 is then input into an analog-to-digital conversion filter 1214 (and/or one or more other filters having a known response), which transmits a signal 1215 to both a mixer 1216 and a mixer 1222. The mixer 1216 mixes the signal 1215 back down by 6.25 kHz and then transmits its output signal 1217 to an intermediate-frequency ("IF") (i.e., bandpass) filter 1218, which produces an estimated blocking signal 1219 representative of the blocking signal 1228 (centered at baseband) as filtered through a blocking-signal bandpass filter (centered at baseband). The mixer 1222 mixes the signal 1215 up by an additional 6.25 kHz and then transmits its output signal 1223 to an IF filter 1224, which produces an unconditioned reference signal 1225 that is representative of the blocking signal 1228 (located where it lies in the shared-channel signal when the desired signal is centered at baseband) as filtered through a desired-signal bandpass filter (centered at baseband).

The IF filter 1218 outputs the estimated blocking signal 1219 to both an estimate-timing block 1230 and an apply-timing block 1220. The estimate-timing block 1230 also receives the blocking signal 1228. The estimate-timing block 1230 calculates a timing difference between the estimated blocking signal 1219 and the blocking signal 1228, and outputs a timing-difference signal 1231 to both the apply-timing block 1220 and to an apply-timing block 1226. In an embodiment, the estimate-timing block 1230 uses a portion of the samples of the blocking signal 1228 as coefficients of a matched filter, and applies that matched filter to the estimated blocking signal 1219 to determine a timing difference between the blocking signal 1228 and the estimated blocking signal 1219, leveraging the fact that the estimated blocking signal 1219 is generated by a modulation of the bits 1202, which were the result of a corresponding demodulation of the blocking signal 1228. The timing-difference signal 1231 (i.e., a timing compensation) from the estimate-timing block 1230 is applied (i) to the estimated blocking signal 1219 by the apply-timing block 1220 and (ii) to the unconditioned reference signal 1225 by the apply-timing block 1226.

The reference-signal-generation system 1200 also includes a channel-estimation block 1232 that receives (i) a timing-corrected estimated blocking signal 1221 that is output by the apply-timing block 1220 and (ii) the blocking signal 1228. The channel-estimation block 1232 compares those two input signals 1221 and 1228 to derive an estimated channel response. The channel-estimation block 1232 outputs an estimated-channel-response signal 1233 to both an apply-channel-estimation block 1234 and an inverting block 1236. In at least one embodiment, including in the embodiment that is depicted in FIGS. 12 and 13, the channel-estimation block 1232 uses adaptive channel estimation (and therefore includes the term "adaptive" in FIG. 13). This is by way of example, as other channel-estimation techniques could be used.

The apply-channel-estimation block 1234 applies the estimated-channel-response signal 1233 to the output 1227 of the apply-timing block 1226, and generates and outputs an intermediately-conditioned reference signal 1235 to an apply-correction block 1250. The inverting block 1236 inverts the estimated-channel-response signal 1233, and outputs an inverted estimated-channel-response signal 1237 to an apply-channel-correction block 1238, which applies the inverted estimated channel-response signal 1237 to the blocking signal 1228, and outputs a channel-corrected blocking signal 1239 to both an adaptive-crystal-filter-estimation block 1240 and a cross-correlation block 1248.

It is explicitly noted that block 1240 could more generally be any suitable type of filter-response-estimation block, and that block 1240 being an adaptive-crystal-filter-estimation block in this description (and as labeled in FIG. 13) is by way of example and not limitation. Indeed, an adaptive estimate is only one of a number of possible approaches that could be used to estimate any unknown filter response from a transmitter and/or receiver. Moreover, as a general matter, the present systems and methods endeavor to use known responses to better estimate unknown responses and therefore better cancel blocking signals to obtain desired signals.

In the depicted embodiment, the adaptive-crystal-filter-estimation block 1240 receives (i) the timing-corrected estimated blocking signal 1221 from the apply-timing block 1220 and (ii) the channel-corrected blocking signal 1239 from the apply-channel-correction block 1238, and derives from those two input signals 1221 and 1239 an estimated crystal-filter coefficient 1242 (which in at least one embodiment includes multiple coefficients), which the adaptive-crystal-filter-estimation block 1240 outputs to a one-slot-delay block 1244. The one-slot-delay block 1244 applies a one-timeslot delay to the estimated crystal-filter coefficient(s) 1242, and accordingly outputs a delayed estimated crystal-filter coefficient 1245 (which, similar to the estimated crystal-filter coefficient(s) 1242, includes multiple coefficients in at least one embodiment) to an estimated-crystal-filter block 1246.

In the depicted embodiment, the estimated-crystal-filter block 1246 is a digital filter that applies the delayed estimated crystal-filter coefficient(s) 1245 to the timing-corrected estimated blocking signal 1221, and accordingly outputs a signal 1247 to a cross-correlation block 1248, which also receives the channel-corrected blocking signal 1239 from the apply-channel-correction block 1238, and accordingly outputs a correction signal 1249 to the apply-correction block 1250. The apply-correction block 1250 applies the correction signal 1249 to the intermediately-conditioned reference signal 1235, and accordingly outputs a conditioned reference signal 1252, which an ANC system (or other blocking-signal-canceling system) may receive and use to cancel the blocking signal 1228 from the desired signal.

Figure 14:
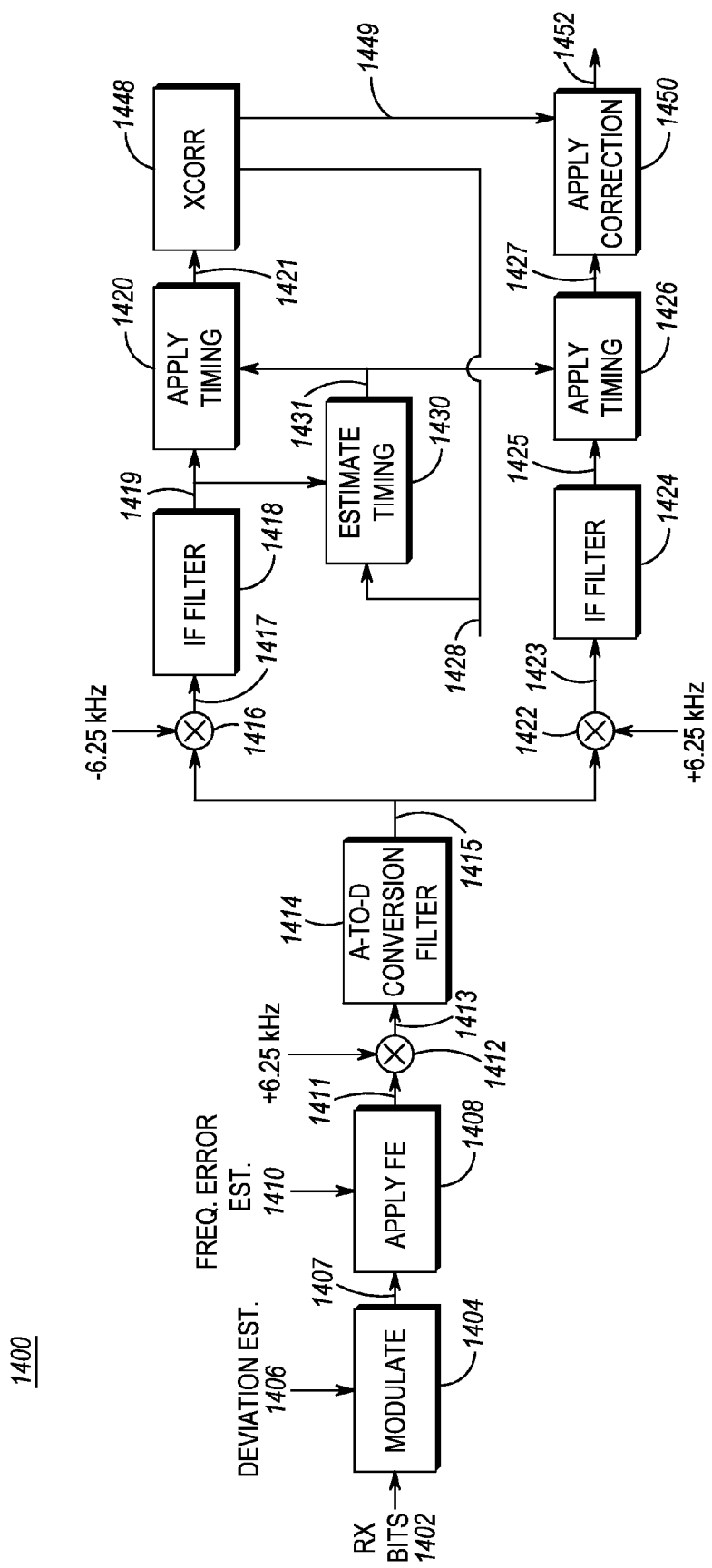
FIG. 14 is a diagram of a fourth example reference-signal-generation system, in accordance with at least one embodiment.

It is noted that the overall scope of the above-described example reference-signal-generation systems 600 of FIG. 6, 1006 of FIG. 11, and 1200 of FIGS. 12-13, as well as the below-described example reference-signal-generation system 1400 of FIG. 14 are approximately the same. For example, each such example reference-signal-generation system receives a blocking signal and bits corresponding to a demodulation of that blocking signal, and outputs a conditioned reference signal. The organization of depicted elements and depicted signals, as well as the depicted level of example detail, is similar as between the example reference-signal-generation systems 600 of FIG. 6 and 1006 of FIG. 11, and is similar as between the example reference-signal-generation systems 1200 of FIGS. 12-13 and 1400 of FIG. 14. Furthermore, the below-described reference-signal-generation system 1400 of FIG. 14 is in many ways a subset of the above-described reference-signal-generation system 1200 of FIGS. 12-13. Moreover, the above-described example reference-signal-generation system 1006 of FIG. 11 is in many ways a superset of the example reference-signal-generation system 600 of FIG. 6.

FIG. 14 is a diagram of a fourth example reference-signal-generation system 1400, in accordance with at least one embodiment. The reference-signal-generation system 1400 includes a modulate block 1404 that receives bits 1402 corresponding to a demodulation of a blocking signal 1428. The modulate block 1404 modulates the received bits 1402 while also applying thereto a deviation-estimate signal 1406, and outputs the result 1407 to an apply-frequency-error block 1408. The apply-frequency-error block 1408 receives and applies a frequency-error-estimation signal 1410 and outputs the result 1411 to a mixer 1412, which mixes the signal 1411 up by 6.25 kHz.

The output 1413 of the mixer 1412 is then input into an analog-to-digital conversion filter 1414, which transmits its output signal 1415 to both a mixer 1416 and a mixer 1422.

The mixer 1416 mixes its input signal 1415 back down by 6.25 kHz and then transmits its output signal 1417 to an IF filter 1418, which produces an estimated blocking signal 1419 representative of the blocking signal 1428 (centered at baseband) as filtered through a blocking-signal band (centered at baseband). The mixer 1422 mixes its input signal 1415 up by an additional 6.25 kHz and then transmits its output signal 1423 to an IF filter 1424, which produces an unconditioned reference signal 1425 that is representative of the blocking signal 1428 (located where it lies in the shared-channel signal when the desired signal is centered at baseband) as filtered through a desired-signal band (centered at baseband).

The IF filter 1418 outputs the estimated blocking signal 1419 to both an estimate-timing block 1430 and an apply-timing block 1420. The estimate-timing block 1430 also receives the blocking signal 1428. The estimate-timing block 1430, which in at least one embodiment functions similar to the manner in which the estimate-timing block 1230 is described above as functioning, calculates a timing difference between the estimated blocking signal 1419 and the blocking signal 1428, and outputs a timing-difference signal 1431 to both the apply-timing block 1420 and to an apply-timing block 1426. The timing-difference signal 1431 (i.e., a timing compensation) from the estimate-timing block 1430 is applied (i) to the estimated blocking signal 1419 by the apply-timing block 1420 and (ii) to the unconditioned reference signal 1425 by the apply-timing block 1426.

The apply-timing block 1420 outputs a timing-corrected estimated blocking signal 1421 to a cross-correlation block 1448, which also receives the blocking signal 1428. The cross-correlation block 1448 compares its two input signals—i.e., the timing-corrected estimated blocking signal 1421 and the blocking signal 1428, and accordingly outputs a correction signal 1449 to an apply-correction block 1450. The apply-timing block 1426 outputs a timing-corrected reference signal 1427 to the apply-correction block 1450, which in turn applies the correction signal 1449 to the timing-corrected reference signal 1427, and accordingly outputs a conditioned reference signal 1452.

Figure 15:
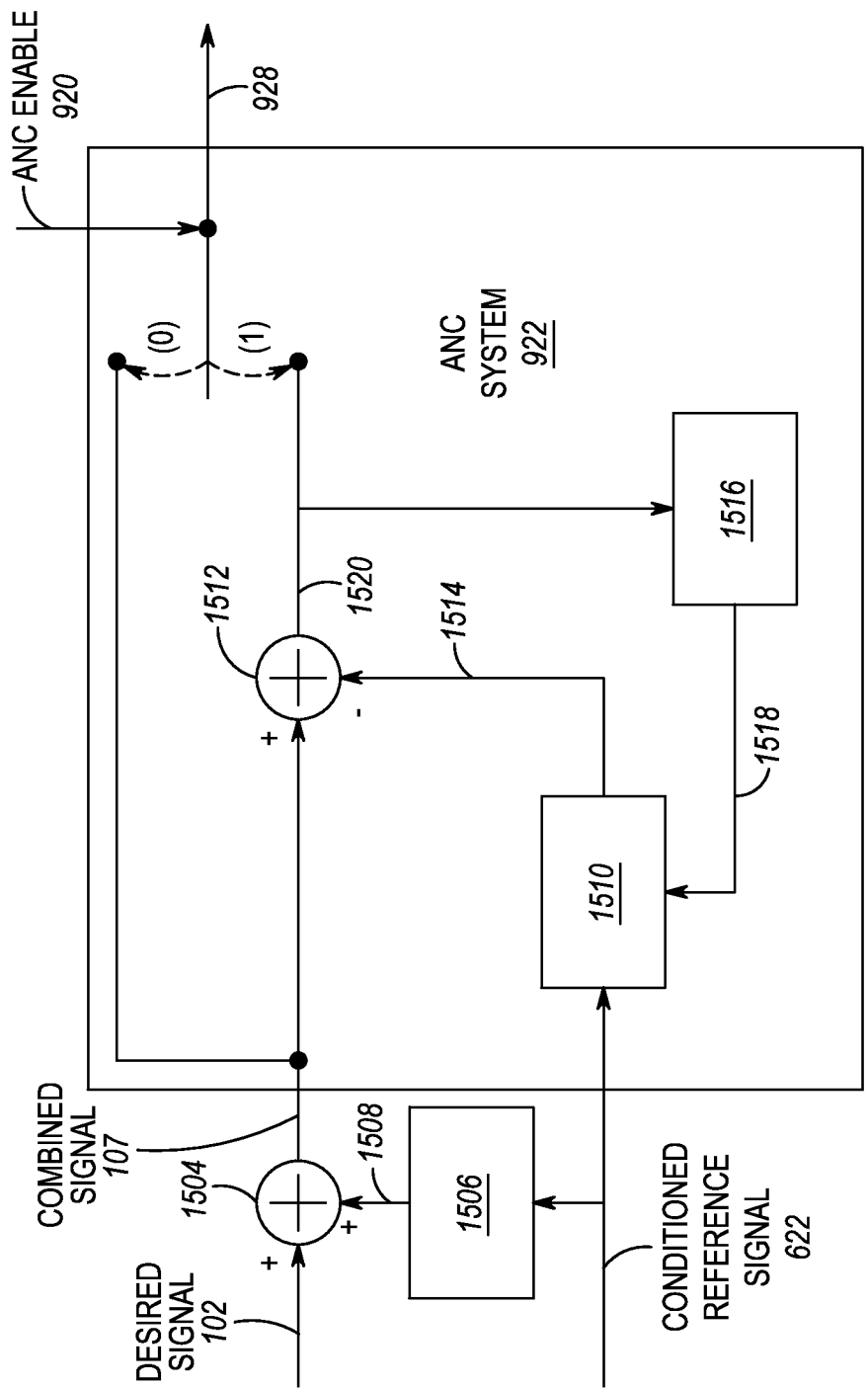
FIG. 15 is a diagram of an example adaptive-noise-cancellation (ANC) system, in accordance with at least one embodiment.

FIG. 15 is a diagram of an example ANC system, in accordance with at least one embodiment. In particular, FIG. 15 is a diagram of the example ANC system 922 of FIGS. 9 and 10. As described above, the ANC system 922 (i) receives three input signals: the combined signal 107, the conditioned reference signal 622 (or 1008 in the case of FIGS. 10 and 11), and the ANC-enable signal 920 and (ii) outputs a signal 928. In the depicted embodiment, the ANC system 922 includes an approximated unknown filter 1510, an adder 1512, and an adaptation block 1516.

As depicted in FIG. 15, the combined signal 107 can be modeled as the output of an adder 1504 that takes as its inputs the desired signal 102 and a modeled interference signal 1508, where the modeled interference signal 1508 represents the output of a modeled unknown filter 1506 that takes as its input the conditioned reference signal 622. The modeled interference signal 1508 thus corresponds to the left tail 105 (of the blocking signal 104) as depicted in FIG. 4.

The approximated unknown filter 1510 takes as its inputs the conditioned reference signal 622 and an adjustment signal 1518, and outputs a replica interference signal 1514 to the adder 1512, which subtracts the replica interference signal 1514 from the combined signal 107, and outputs an estimated desired signal 1520. Over time, the adaptation block 1516 uses the estimated desired signal 1520 to generate the adjustment signal 1518 so as to adapt the approximated unknown filter 1510 to get as close as possible to replicating the transfer function of the modeled unknown filter 1506, such that, over time, the replica interference signal 1514 will closely approximate the modeled interference signal 1508.

Thus, over time, the replica interference signal 1514 should closely approximate the left tail 805 (of the remodulated blocking signal 614) that is depicted in FIG. 8. As the difference between the interference signal 1508 and the replica interference signal 1514 diminishes to near zero by operation of the adaptation block 1516 and the approximated unknown filter 1510, the estimated desired signal 1520 will very closely approximate the desired signal 102.

In one embodiment, the adaptation block 1516 uses a least-squares algorithm, such as recursive least squares, to obtain by adaptation over time a set of filter coefficients that approximate the transfer function of the modeled unknown filter 1506. The transfer function of the modeled unknown filter 1506 may be comprised of a cascade of unknown or constantly varying transmitter, receiver, and/or channel-transfer functions that have been applied to the left tail 105 of the blocking signal 104 prior to input into ANC system 922. One such example source of an unknown transfer function results from the application of receiver-front-end filter 904 of FIGS. 9 and 10 to the received shared-channel signal 111 (that includes the desired signal 102 and the blocking signal 104). In at least one embodiment, the approximated unknown filter 1510 is a digital filter that applies the filter coefficients (e.g., adjustment signal 1518) from adaptation block 1516. The approximated unknown filter 1510 operates on the conditioned reference signal 622 to apply the transfer function effectuated by the filter coefficients from the adaptation block 1516, which approximates the cascaded response of all unknown filter transfer functions applied by the modeled unknown filter 1506. This results in the replica interference signal 1514 being a close approximation to the modeled interference signal 1508, which allows subtraction of the replica interference signal 1514 from the combined signal 107, to cancel the left tail 105 of the blocking signal 104 to obtain the desired signal 102.

As described above, in at least one embodiment, the near-far detector 918 sets the ANC-enable signal 920 equal to 1 to enable the ANC operation of the ANC system 922 (when, e.g., the computed difference between the magnitudes of the blocking signal 104 and the combined signal 107 (as a proxy for the desired signal 102) exceeds a threshold) or instead sets the ANC-enable signal 920 equal to 0 to disable the ANC operation of the ANC system 922 (when, e.g., the computed difference between those two magnitudes does not exceed the threshold). In the embodiment that is depicted in FIG. 15, the ANC-enable signal 920 being equal to 1 sets the output signal 928 to be the estimated desired signal 1520, whereas the ANC-enable signal 920 being equal to 0 sets the output signal 928 to be the combined signal 107. As described above, in at least one embodiment, the ANC system 922 outputs the signal 928 to the demodulator 926 for demodulation. Moreover, in some embodiments, there is neither a near-far detector 918 nor an ANC-enable signal 920 (and no functionally equivalent components and signals), and the output signal 928 is the estimated desired signal 1520. And certainly other example implementations could be listed here.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of producing a reference signal for canceling a blocking signal to obtain a desired signal, the blocking signal being centered in a blocking-signal band, the desired signal being centered in a desired-signal band, the method comprising:
   receiving the blocking signal;
   receiving a set of blocking bits corresponding to a demodulation of the blocking signal;
   generating a remodulated blocking signal at least in part by modulating the received set of blocking bits;
   generating an estimated blocking signal at least in part by passing the remodulated blocking signal through a blocking-band bandpass filter;
   generating an unconditioned reference signal at least in part by passing the remodulated blocking signal through a desired-band bandpass filter;
   identifying one or more signal-parameter differences between the blocking signal and the estimated blocking signal;
   generating a conditioned reference signal at least in part by applying one or more signal compensations to the unconditioned reference signal, the one or more applied signal compensations being based at least in part on the one or more identified signal-parameter differences; and
   outputting the conditioned reference signal to a blocking-signal-canceling system.

2. The method of claim 1, wherein both the desired-signal band and the blocking-signal band are within a shared radio channel.

3. The method of claim 2, further comprising:
   receiving a shared-channel signal that was received via the shared radio channel, the shared-channel signal comprising the desired signal and the blocking signal; and
   processing the received shared-channel signal through one or more of a receiver-front-end filter, an analog-to-digital conversion filter, and a hardware-compensation filter.

4. The method of claim 2, wherein the shared radio channel is a 25-kilohertz-(kHz)-wide radio channel.

5. The method of claim 2, wherein one or both of the desired channel and the blocking channel are offset from a center frequency of the shared radio channel.

6. The method of claim 1, further comprising:
   receiving one or more error estimations corresponding to the demodulation of the blocking signal; and
   applying one or more adjustments to the remodulated blocking signal based at least in part on the one or more received error estimations.

7. The method of claim 6, wherein the one or more error estimations comprises a deviation estimation.

8. The method of claim 6, wherein the one or more error estimations comprises a frequency-error estimation.

9. The method of claim 1, wherein one of the one or more identified signal-parameter differences between the blocking signal and the estimated blocking signal is a timing difference between the blocking signal and the estimated blocking signal.

10. The method of claim 9, wherein applying one or more signal compensations to the unconditioned reference signal comprises applying a timing compensation to the unconditioned reference signal.

11. The method of claim 1, further comprising estimating a filter response in the blocking-signal band using the blocking signal and the estimated blocking signal.

12. The method of claim 11, further comprising filtering the estimated blocking signal using a filter that is based at least in part on the estimated filter response.

13. The method of claim 1, wherein one of the one or more identified signal-parameter differences between the blocking signal and the estimated blocking signal is a set of magnitude and phase differences between the blocking signal and the estimated blocking signal.

14. The method of claim 13, wherein applying one or more signal compensations to the unconditioned reference signal comprises applying a magnitude-and-phase-set compensation to the unconditioned reference signal.

15. The method of claim 1, further comprising:
   estimating a channel response of the blocking signal; and
   applying a channel-response correction to the unconditioned reference signal, wherein the channel-response correction is based at least in part on the estimated channel response.

16. The method of claim 1, wherein the blocking-signal-canceling system comprises an adaptive-noise-cancellation (ANC) system.

17. The method of claim 1, further comprising selectively enabling or disabling the blocking-signal-canceling system based at least in part on a near-far comparison of the desired signal and the blocking signal.

18. The method of claim 1, further comprising the blocking-signal-canceling system generating an estimated desired signal at least in part by using the conditioned reference signal to cancel the blocking signal to obtain the desired signal.

19. The method of claim 18, further comprising demodulating the estimated desired signal.

20. A system configured to produce a reference signal that is useable for canceling a blocking signal to obtain a desired signal, the blocking signal being centered in a blocking-signal band, the desired signal being centered in a desired-signal band, the system configured to receive as input (i) the blocking signal and (ii) a set of blocking bits corresponding to a demodulation of the blocking signal, the system comprising:

a blocking-bits modulator configured to generate a remodulated blocking signal at least in part by modulating the set of blocking bits;

a blocking-band bandpass filter configured to generate an estimated blocking signal by filtering the remodulated blocking signal;

a desired-band bandpass filter configured to generate an unconditioned reference signal by filtering the remodulated blocking signal;

a signal comparator configured to identify one or more signal-parameter differences between the blocking signal and the estimated blocking signal; and a reference-signal conditioner configured to generate a conditioned reference signal at least in part by applying one or more signal compensations to the unconditioned reference signal, the one or more applied signal compensations being based at least in part on the one or more identified signal-parameter differences, the reference-signal conditioner being further configured to output the conditioned reference signal to a reference-signal input of a blocking-signal-canceling system.

\* \* \* \* \*